United States Patent
Kumagai

(10) Patent No.: US 9,914,481 B2
(45) Date of Patent: Mar. 13, 2018

(54) VEHICLE LOWER PORTION STRUCTURE

(71) Applicant: TOYOTA JIDOSHA KABUSHIKI KAISHA, Toyota-shi (JP)

(72) Inventor: Koushi Kumagai, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/028,292

(22) PCT Filed: Sep. 19, 2014

(86) PCT No.: PCT/JP2014/074965
§ 371 (c)(1),
(2) Date: Apr. 8, 2016

(87) PCT Pub. No.: WO2015/056527
PCT Pub. Date: Apr. 23, 2015

(65) Prior Publication Data
US 2016/0251034 A1 Sep. 1, 2016

(30) Foreign Application Priority Data
Oct. 16, 2013 (JP) ................................. 2013-215570

(51) Int. Cl.
*B60J 7/00* (2006.01)
*B62D 21/15* (2006.01)
(Continued)

(52) U.S. Cl.
CPC ........... *B62D 21/155* (2013.01); *B62D 21/02* (2013.01); *B62D 25/025* (2013.01); *B62D 25/20* (2013.01);
(Continued)

(58) Field of Classification Search
CPC .............. Y02T 10/7005; C09D 163/00; B60K 31/047; B60L 2200/26; B60L 2250/26
(Continued)

(56) References Cited

U.S. PATENT DOCUMENTS 5,002,333 A * 3/1991 Kenmochi ............. B62D 21/10
296/204
5,074,587 A * 12/1991 Schwede ................ B62D 21/10
180/311
(Continued)

FOREIGN PATENT DOCUMENTS

JP 2003-237636 8/2003
JP 2010-23538 A 2/2010
(Continued)

OTHER PUBLICATIONS

International Search Report dated Nov. 4, 2014 in PCT/JP2014/074965 filed on Sep. 19, 2014.

*Primary Examiner* — Kiran B Patel
(74) *Attorney, Agent, or Firm* — Oblon, McClelland, Maier & Neustadt, L.L.P.

(57) ABSTRACT

A reinforcement member disposed at a front portion of a floor panel is disposed angled toward a vehicle width direction inside on progression from a position (input portion on a vehicle width direction outside and vehicle front-rear direction front side of the floor panel toward the vehicle front-rear direction rear side. An outer end portion of the reinforcement member is joined to a rocker, and an inner end portion of the reinforcement member is joined to a floor tunnel portion. When the vehicle is involved in a frontal collision, collision load is input in an oblique direction to the position on the vehicle width direction outside and the vehicle front-rear direction front side of the floor panel.

3 Claims, 27 Drawing Sheets

(51) Int. Cl.
*B62D 25/20* (2006.01)
*B62D 25/02* (2006.01)
*B62D 21/02* (2006.01)

(52) U.S. Cl.
CPC ..... *B62D 25/2036* (2013.01); *B62D 25/2045* (2013.01)

(58) Field of Classification Search
USPC .................................................. 296/187.08
See application file for complete search history.

(56) References Cited

U.S. PATENT DOCUMENTS

| | | | | |
|---|---|---|---|---|
| 6,227,610 B1* | 5/2001 | Iwatsuki | ............ | B62D 25/025 296/204 |
| 6,802,558 B2* | 10/2004 | Matsuoka | ............ | B62D 25/087 296/193.08 |
| 6,908,145 B2* | 6/2005 | Joaquin | ............ | B62D 25/20 29/897.2 |
| 7,032,961 B2* | 4/2006 | Matsuda | ............ | B62D 21/152 296/187.11 |
| 7,090,290 B2* | 8/2006 | Neumeier | ............ | B62D 21/00 280/793 |
| 7,338,115 B2* | 3/2008 | Rocheblave | ............ | B62D 21/152 296/187.11 |
| 7,469,957 B1* | 12/2008 | Boettcher | ............ | B62D 21/02 296/193.07 |
| 7,699,385 B2* | 4/2010 | Kurata | ............ | B62D 25/20 296/187.08 |
| 7,766,420 B2* | 8/2010 | Maruyama | ............ | B62D 21/152 296/192 |
| 7,891,728 B2* | 2/2011 | Westing | ............ | B62D 21/06 280/793 |
| 7,905,541 B2* | 3/2011 | Yamaguchi | ............ | B62D 25/2027 296/203.04 |
| 8,052,204 B2* | 11/2011 | Boettcher | ............ | B62D 21/02 280/785 |
| 8,075,049 B2* | 12/2011 | Mendoza | ............ | B62D 25/20 296/187.12 |
| 8,276,980 B2* | 10/2012 | Boettcher | ............ | B62D 25/2018 296/193.07 |
| 8,292,356 B2* | 10/2012 | Ishigame | ............ | B62D 21/157 296/193.05 |
| 8,439,430 B2* | 5/2013 | Sato | ............ | B62D 25/20 296/187.08 |
| 8,556,336 B2* | 10/2013 | Yasuhara | ............ | B62D 21/11 296/193.07 |
| 8,585,134 B2* | 11/2013 | Yasui | ............ | B62D 21/152 296/204 |
| 8,602,454 B1* | 12/2013 | Baccouche | ............ | B60K 1/04 180/68.5 |
| 8,985,681 B2* | 3/2015 | Fujii | ............ | B62D 25/2036 296/204 |
| 9,238,487 B1* | 1/2016 | Young | ............ | B62D 25/025 |
| 9,457,843 B2* | 10/2016 | Zornack | ............ | B62D 21/152 |
| 9,499,205 B1* | 11/2016 | Elia | ............ | B62D 21/15 |
| 9,592,856 B2* | 3/2017 | Nakamura | ............ | B62D 25/06 |
| 9,604,671 B2* | 3/2017 | Cortes Saenz | ......... | B62D 21/03 |
| 9,604,672 B2* | 3/2017 | Kaneko | ............ | B62D 21/11 |
| 2003/0006629 A1* | 1/2003 | Kimura | ............ | B60J 5/0477 296/203.03 |
| 2003/0173799 A1* | 9/2003 | Wendland | ............ | B62D 21/152 296/187.01 |
| 2004/0239091 A1* | 12/2004 | Horton | ............ | B62D 21/02 280/781 |
| 2004/0245033 A1* | 12/2004 | Saeki | ............ | B62D 39/00 180/89.1 |
| 2005/0023862 A1* | 2/2005 | Saeki | ............ | B60J 5/0429 296/187.12 |
| 2012/0212009 A1* | 8/2012 | Ishizono | ............ | B62D 25/025 296/193.07 |
| 2013/0049407 A1* | 2/2013 | Kageyama | ............ | B62D 25/2018 296/204 |
| 2013/0175829 A1* | 7/2013 | Kim | ............ | B60K 1/04 296/204 |
| 2014/0001790 A1* | 1/2014 | Zischke | ............ | B62D 25/2018 296/187.03 |
| 2014/0079977 A1* | 3/2014 | Tsujimura | ............ | H01M 2/1077 429/120 |
| 2015/0224983 A1 | 8/2015 | Hiasa et al. | | |
| 2015/0343900 A1* | 12/2015 | Schlangen | ............ | B60G 3/20 180/247 |

FOREIGN PATENT DOCUMENTS

| | | |
|---|---|---|
| JP | 2013-103650 A | 5/2013 |
| JP | 2013-203111 A | 10/2013 |
| JP | 2014-58279 A | 4/2014 |
| WO | WO 2014/041698 A1 | 3/2014 |

* cited by examiner

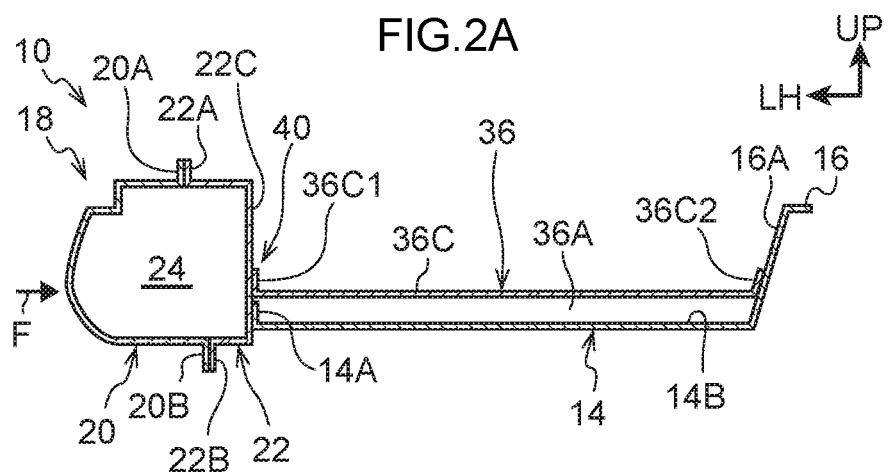
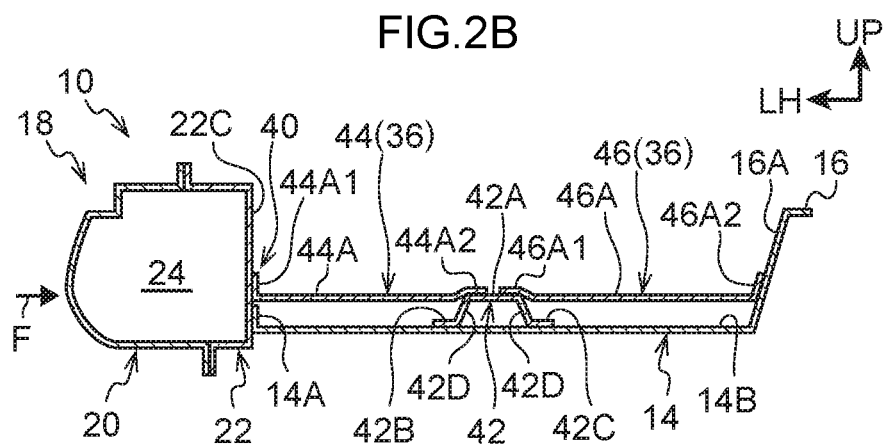
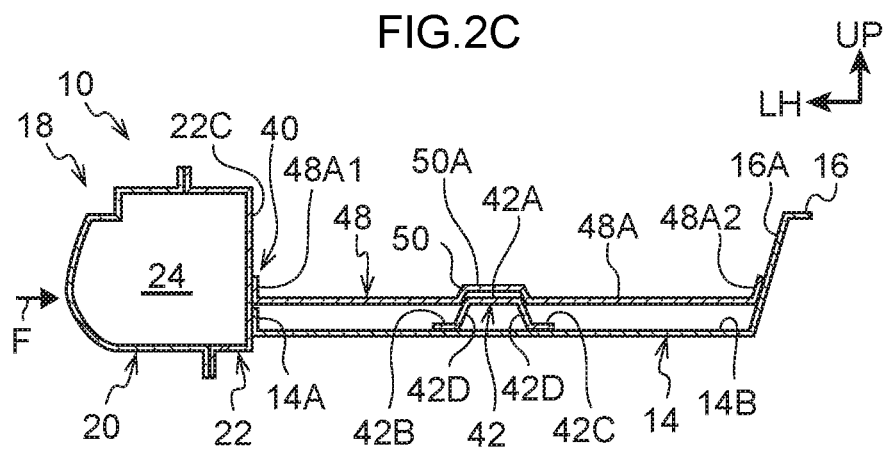

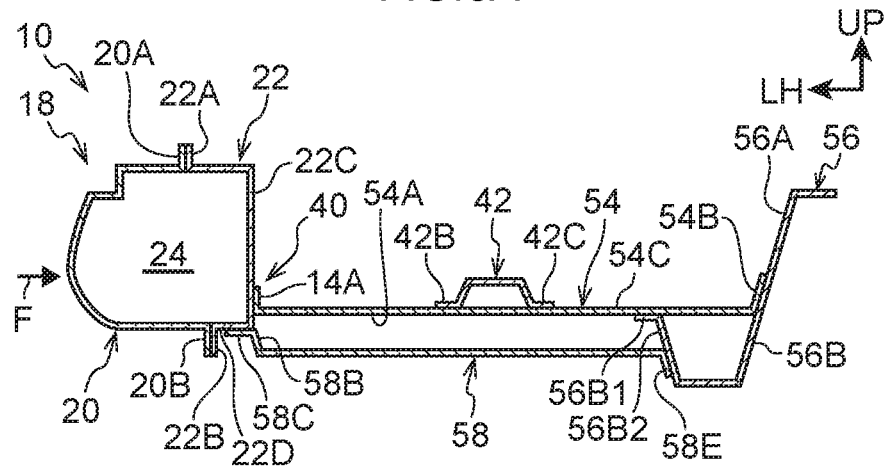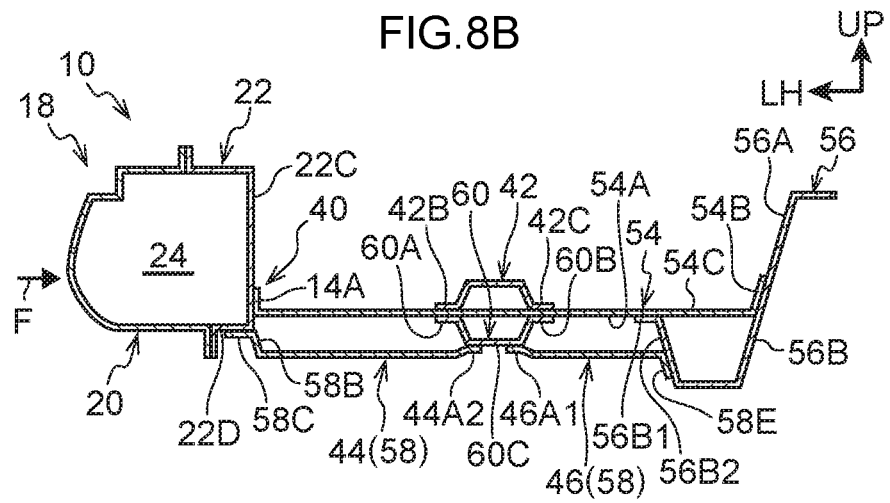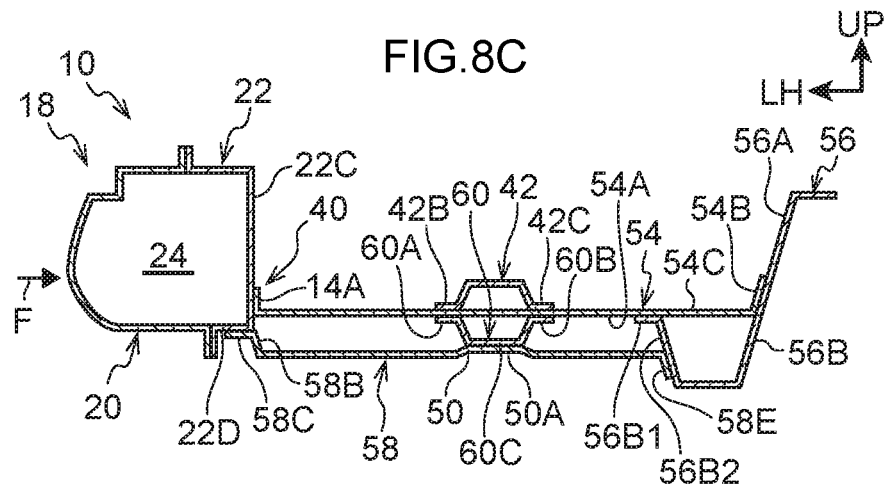

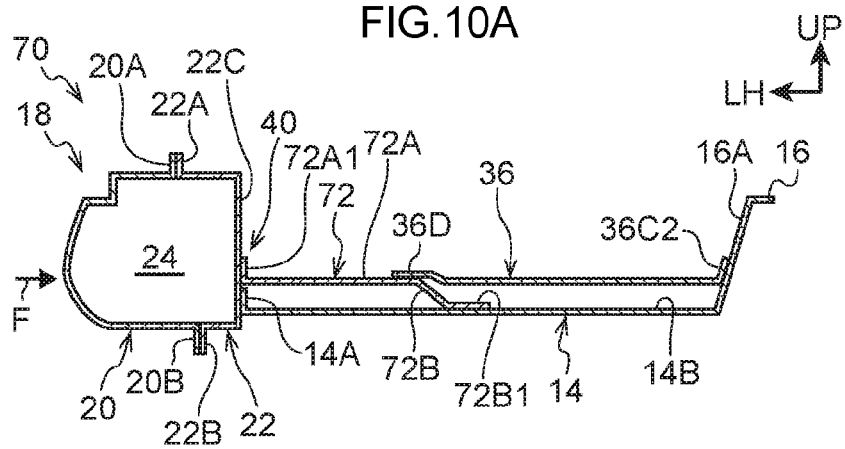
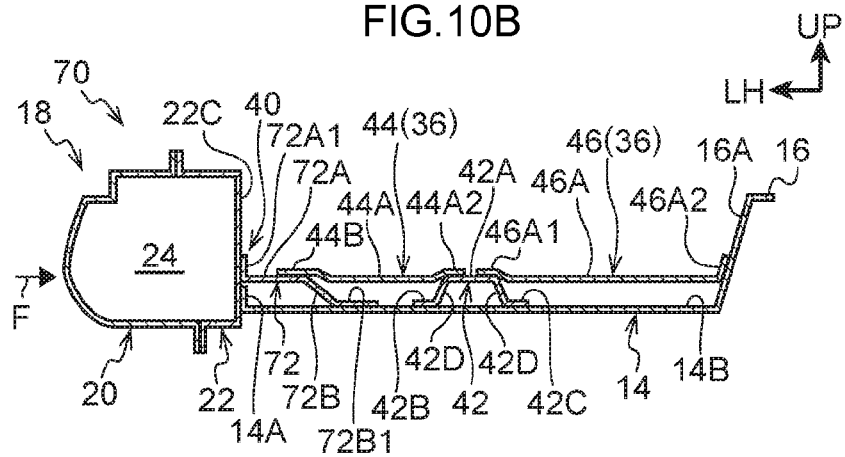
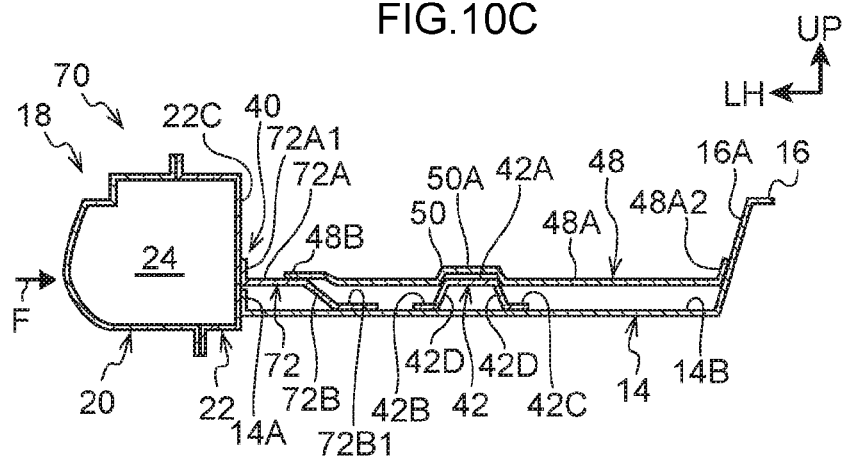

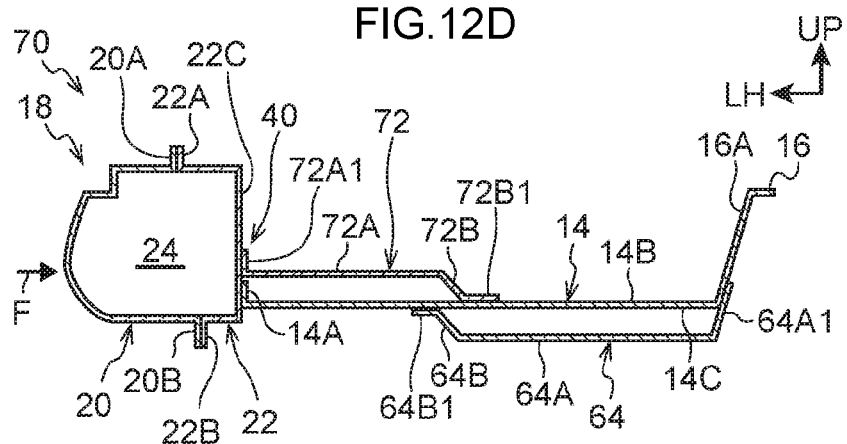
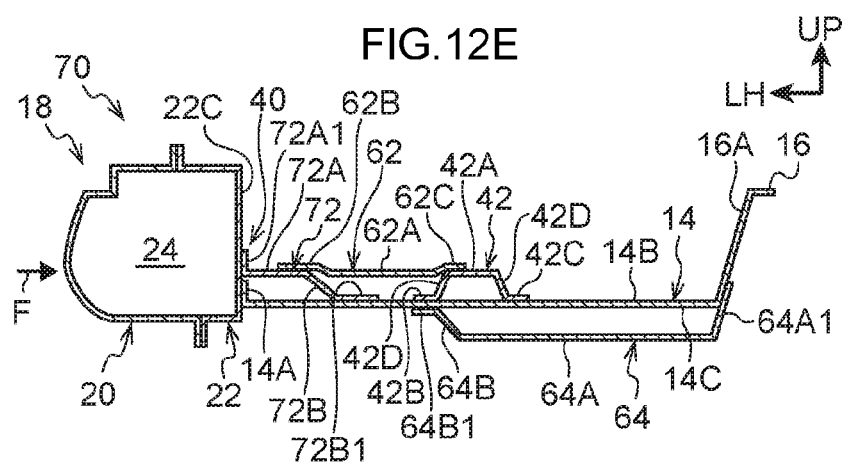
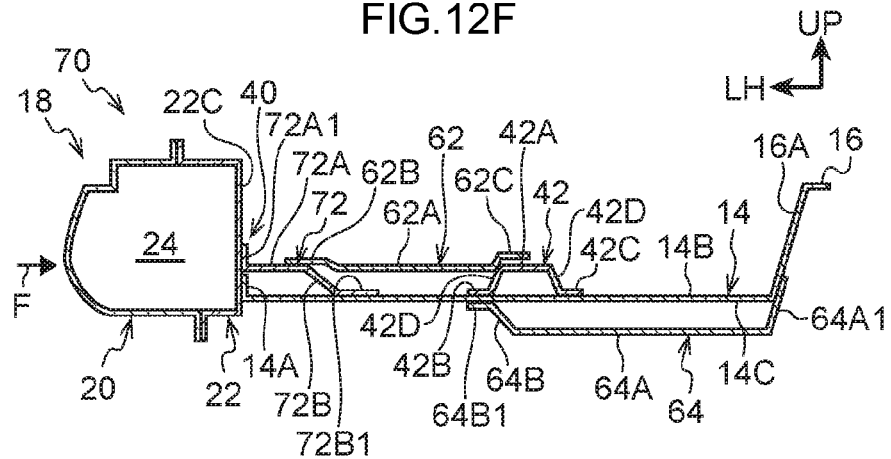

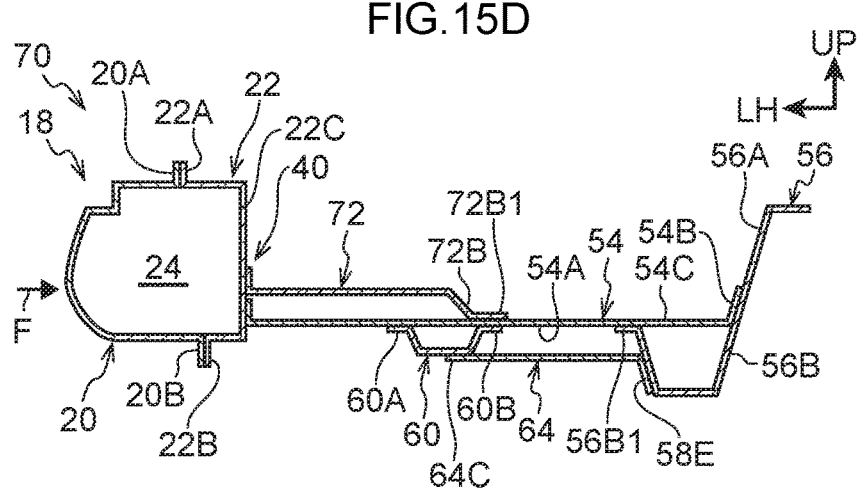
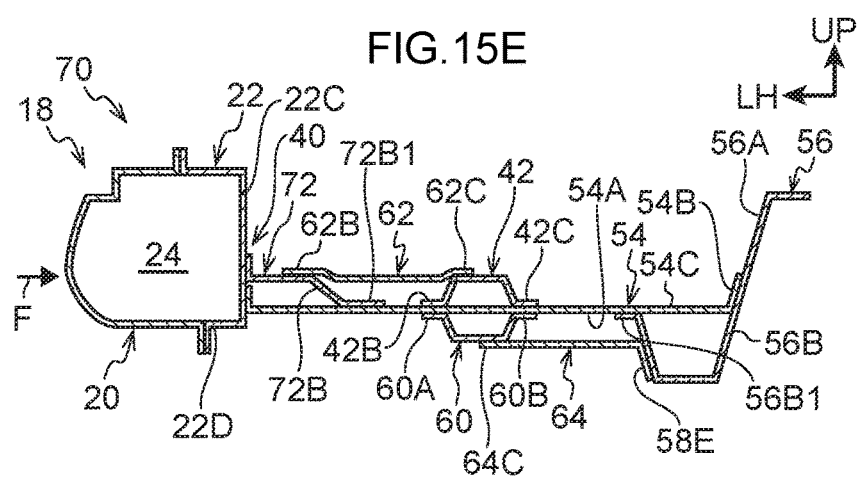
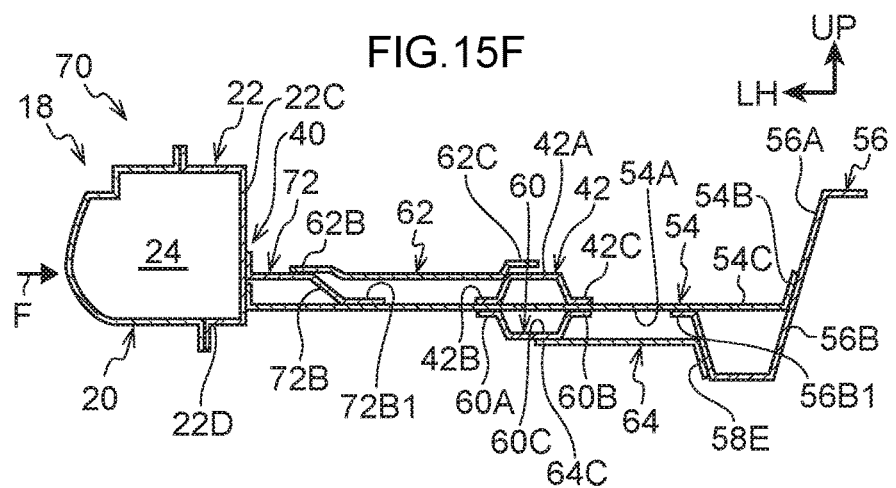

VEHICLE LOWER PORTION STRUCTURE

TECHNICAL FIELD

The present invention relates to a vehicle lower portion structure.

BACKGROUND ART

Japanese Patent Application Laid-Open (JP-A) No. 2010-23538 describes technology in which a reinforcement member spans between a front portion side of a side sill (rocker) and a floor frame (floor side member) at an angle. A join portion between the reinforcement member and the floor frame is provided with a weakened portion that has lower strength than other portions of the floor frame, and the weakened portion deforms in the event of a vehicle frontal collision, thereby suppressing deformation of an overall floor panel.

JP-A No. 2013-203111 describes technology provided with a reinforcement member with a closed cross-section structure that joins a torque box and a front side frame together.

SUMMARY OF INVENTION

Technical Problem

In consideration of the above circumstances, an object of the present invention is to provide a vehicle lower portion structure capable of effectively transmitting collision load toward a vehicle front-rear direction rear side, or toward a vehicle width direction opposite side to the collision side, in the event that the vehicle is involved in a small overlap collision or an oblique collision.

Solution to Problem

A first aspect of the present invention provides a vehicle lower portion structure including: a rocker that is provided running along a vehicle front-rear direction at a vehicle width direction outside of a floor panel configuring a floor portion of a vehicle cabin; a floor tunnel portion that extends along the vehicle front-rear direction at a vehicle width direction central portion of the floor panel; and a reinforcement member that is disposed at a vehicle front-rear direction front portion of the floor panel, that is angled toward the vehicle width direction inside on progression toward the vehicle front-rear direction rear side from an input portion present at a position at the vehicle width direction outside and at the vehicle front-rear direction front side of the floor panel and input with collision load in the event of a frontal collision at the vehicle width direction outside of the vehicle, and that connects the input portion and the floor tunnel portion together, wherein a dash panel is provided at the front portion of the floor panel so as to partition between the vehicle cabin and a power unit room formed at a vehicle front-rear direction front side of the vehicle cabin, and a vehicle front-rear direction front portion of the reinforcement member is connected to either the dash panel, or to a dash cross member extending along the vehicle width direction at the dash panel.

In the above configuration, the rocker is provided running along the vehicle front-rear direction at the vehicle width direction outside of the floor panel. The floor tunnel portion extends along the vehicle front-rear direction at a vehicle width direction central portion of the floor panel. The reinforcement member is disposed at the vehicle front-rear direction front portion of the floor panel. The input portion that is input with collision load in the event of a frontal collision at the vehicle width direction outside of the vehicle is at the vehicle width direction outside and the vehicle front-rear direction front side of the floor panel. The reinforcement member is angled toward the vehicle width direction inside on progression from the input portion toward the vehicle front-rear direction rear side, and connects the input portion and the floor tunnel portion together.

In the event that the vehicle is involved in a frontal collision such as a small overlap collision or an oblique collision, collision load is input to the vehicle width direction outside and the vehicle front-rear direction front side (input portion) of the floor panel. The collision load input to the input portion in the small overlap collision or the oblique collision can accordingly be effectively transmitted to the floor tunnel portion through the reinforcement member, since the input portion and the floor tunnel portion are connected together by the reinforcement member.

In the present aspect, the vehicle front-rear direction front portion of the reinforcement member is connected to either the dash panel provided at the front portion of the floor panel, or to the dash cross member extending along the vehicle width direction at the dash panel. Accordingly, the collision load input to the vehicle in a small overlap collision or an oblique collision is transmitted from the dash panel or the dash cross member to the floor tunnel portion through the reinforcement member.

Note that "connects" encompasses cases in which the reinforcement member is joined to the input portion and/or to the floor tunnel portion indirectly through another member, as well as cases in which the reinforcement member is directly joined to the input portion and the floor tunnel portion.

In a second aspect of the present invention, configuration may be made such that in the first aspect of the present invention, the vehicle front-rear direction front portion of the reinforcement member is also connected to the rocker.

According to the above configuration, the vehicle front-rear direction front portion of the reinforcement member is also connected to the rocker. Accordingly, the collision load input to the vehicle in a small overlap collision or an oblique collision is transmitted from the rocker to the floor tunnel portion through the reinforcement member.

In a third aspect of the present invention configuration may be made such that in either the first aspect or the second aspect of the present invention: a floor cross member is provided spanning between the rocker and the floor tunnel portion in the vehicle width direction; and at least a portion of a vehicle front-rear direction rear portion of the reinforcement member is joined to the floor cross member.

In the above configuration, the floor cross member is provided spanning between the rocker and the floor tunnel portion in the vehicle width direction. At least a portion of the vehicle front-rear direction rear portion of the reinforcement member is joined to the floor cross member. This thereby enables the collision load input to the vehicle in a small overlap collision or an oblique collision to be transmitted to the floor cross member as well as the floor tunnel portion as it is being transmitted to the floor tunnel portion through the reinforcement member.

In a fourth aspect of the present invention, configuration may be made such that in any one of the first aspect to the third aspect of the present invention: a floor side member is provided extending along the vehicle front-rear direction between the rocker and the floor tunnel portion; and the reinforcement member straddles the floor side member and connects the input portion and the floor tunnel portion together.

In the above configuration, the floor side member is provided extending along the vehicle front-rear direction between the rocker and the floor tunnel portion. The reinforcement member straddles the floor side member and connects the input portion and the floor tunnel portion together.

A fifth aspect of the present invention is of any one of the first aspect to the fourth aspect of the present invention, wherein the reinforcement member is split into a first reinforcement member and a second reinforcement member by the floor side member, and the first reinforcement member connects the input portion and the floor side member together, and the second reinforcement member connects the floor side member and the floor tunnel portion together.

In the above configuration, the reinforcement member is split into the first reinforcement member and the second reinforcement member by the floor side member. The first reinforcement member connects the input portion and the floor side member together, and the second reinforcement member connects the floor side member and the floor tunnel portion together.

A sixth aspect of the present invention is any one of the first aspect to the fifth aspect of the present invention, wherein the reinforcement member is disposed below the floor panel in a vehicle up-down direction.

In the above configuration, the reinforcement member is disposed below the floor panel in the vehicle up-down direction. This thereby enables a space inside the vehicle cabin to be made larger than in cases in which the reinforcement member is disposed above the floor panel in the vehicle up-down direction.

Advantageous Effects of Invention

As described above, the first aspect of the present invention exhibits the excellent advantageous effect of enabling collision load to be effectively transmitted toward the vehicle front-rear direction rear side, or toward the vehicle width direction opposite side to the side of the collision, through the reinforcement member in the event that the vehicle is involved in a small overlap collision or an oblique collision.

The second aspect of the present invention exhibits the excellent advantageous effect of enabling collision load to be effectively transmitted from the rocker toward the vehicle front-rear direction rear side through the reinforcement member and the floor tunnel portion.

The third aspect of the present invention exhibits the excellent advantageous effect of enabling collision load to be dispersed between the floor tunnel portion and the floor cross member.

The fourth aspect of the present invention exhibits the excellent advantageous effect of enabling the rigidity of the floor panel itself to be increased.

The fifth aspect of the present invention exhibits the excellent advantageous effect of enabling collision load transmitted from the rocker to be transmitted to the floor tunnel portion through the floor side member.

The sixth aspect of the present invention exhibits the excellent advantageous effect of enabling a space inside the vehicle cabin to be made larger than in cases in which the reinforcement member is disposed above the floor panel in the vehicle up-down direction.

BRIEF DESCRIPTION OF DRAWINGS

FIG. 2A is a cross-section illustrating a state sectioned along line A-A in FIG. 1.

FIG. 2B is a cross-section illustrating a state sectioned along line B-B in FIG. 3.

FIG. 2C is a cross-section corresponding to FIG. 2B, illustrating a Modified Example (2) of a vehicle lower portion structure according to the first exemplary embodiment of the present invention.

FIG. 8A is a cross-section corresponding to FIG. 7A, illustrating a Modified Example (8) of a vehicle lower portion structure according to the first exemplary embodiment of the present invention.

FIG. 8B is a cross-section corresponding to FIG. 7B, illustrating a Modified Example (8) of a vehicle lower portion structure according to the first exemplary embodiment of the present invention.

FIG. 8C is a cross-section corresponding to FIG. 7C, illustrating a Modified Example (8) of a vehicle lower portion structure according to the first exemplary embodiment of the present invention.

FIG. 10A is a cross-section illustrating a state sectioned along line C-C in FIG. 9.

FIG. 10B is a cross-section corresponding to FIG. 2B, illustrating a Modified Example (1) of the vehicle lower portion structure according to the second exemplary embodiment of the present invention.

FIG. 10C is a cross-section corresponding to FIG. 2C, illustrating a Modified Example (1) of a vehicle lower portion structure according to the second exemplary embodiment of the present invention.

FIG. 12D is a cross-section corresponding to FIG. 5D, illustrating a Modified Example (3) of a vehicle lower portion structure according to the second exemplary embodiment of the present invention.

FIG. 12E is a cross-section corresponding to FIG. 5E, illustrating a Modified Example (3) of a vehicle lower portion structure according to the second exemplary embodiment of the present invention.

FIG. 12F is a cross-section corresponding to FIG. 5F, illustrating a Modified Example (3) of a vehicle lower portion structure according to the second exemplary embodiment of the present invention.

FIG. 15D is a cross-section corresponding to FIG. 14D, illustrating a Modified Example (6) of a vehicle lower portion structure according to the second exemplary embodiment of the present invention.

FIG. 15E is a cross-section corresponding to FIG. 14E, illustrating a Modified Example (6) of a vehicle lower portion structure according to the second exemplary embodiment of the present invention.

FIG. 15F is a cross-section corresponding to FIG. 14F, illustrating a Modified Example (6) of a vehicle lower portion structure according to the second exemplary embodiment of the present invention.

DESCRIPTION OF EMBODIMENTS

Figure 1:
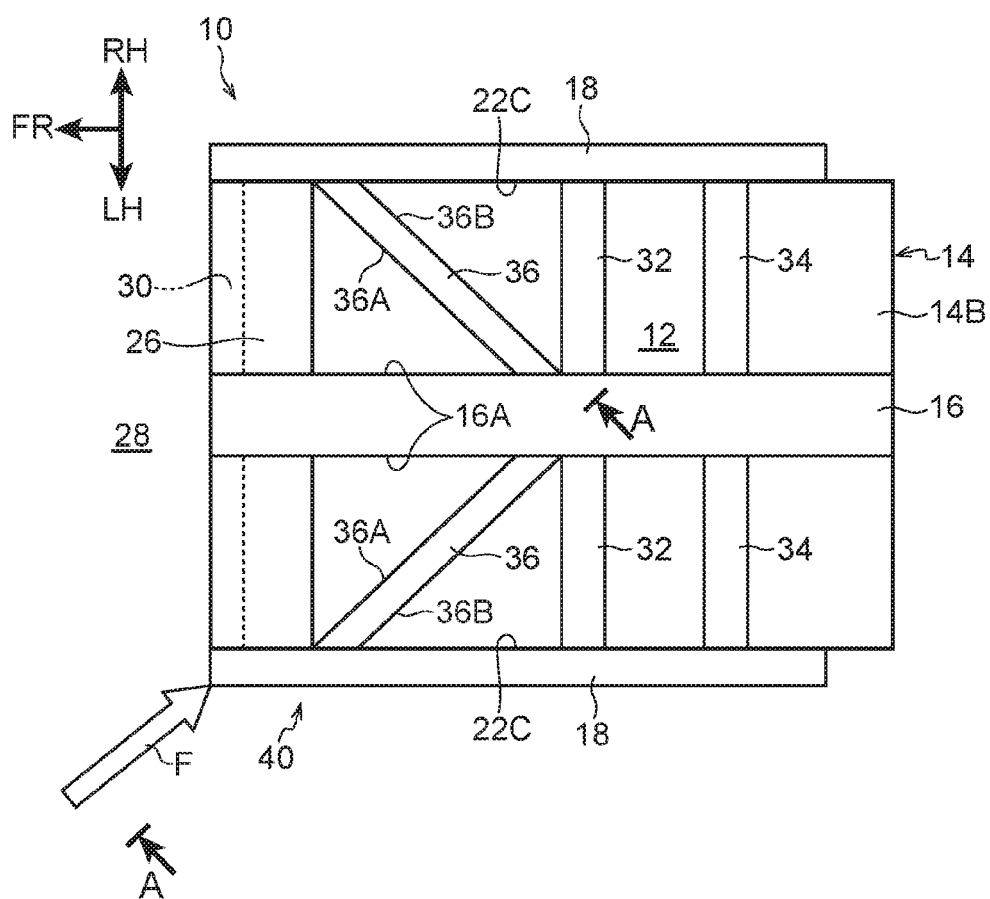
FIG. 1 is a schematic plan view illustrating a vehicle lower portion structure according to a first exemplary embodiment of the present invention.

Explanation follows regarding a vehicle lower portion structure according to exemplary embodiments, with reference to the drawings. In the drawings, the arrow UP indicates a vehicle upward direction, the arrow FR indicates a vehicle front direction, the arrow RH indicates a vehicle right direction, and the arrow LH indicates a vehicle left direction, respectively. In the following explanation, unless specifically stated otherwise, reference to front and rear, up and down, and left and right directions refers to the front and rear in the vehicle front-rear direction, up and down in the vehicle up-down direction, and left and right in the vehicle left-right direction (vehicle width direction) respectively.

First Exemplary Embodiment

Vehicle Lower Portion Structure Overall Configuration

First, explanation is given regarding an overall configuration of a vehicle lower portion structure according to a first exemplary embodiment. FIG. 1 is a schematic plan view of a vehicle lower portion structure 10 according to the present exemplary embodiment. FIG. 2A is a schematic cross-section illustrating a state sectioned along line A-A in FIG. 1.

As illustrated in FIG. 1 and FIG. 2A, the vehicle lower portion structure 10 according to the present exemplary embodiment includes a floor panel 14 configuring a floor portion of a vehicle cabin 12. The floor panel 14 is formed by a thin sheet component such as a steel sheet, and extends in both a vehicle front-rear direction and a vehicle width direction.

A vehicle width direction central portion of the floor panel 14 is formed with a floor tunnel portion 16 that protrudes toward the upper side and is open toward the lower side, and that has its length direction running along the vehicle front-rear direction. The floor tunnel portion 16 forms a substantially trapezoidal cross-section profile when sectioned along its width direction, this being orthogonal to the length direction. Side walls 16A of the floor tunnel portion 16 are formed in a state inclined toward the width direction central side of the floor tunnel portion 16 on progression upward.

Rocker Configuration

Explanation follows regarding configuration of a rocker. Rockers 18 extend along the vehicle front-rear direction at vehicle width direction outsides of the floor panel 14. Each of the rockers 18 is configured including a rocker outer panel 20 disposed on the vehicle width direction outside, and a rocker inner panel 22 disposed on the vehicle width direction inside.

When sectioned along the vehicle width direction, the cross-section profile of the rocker outer panel 20 configures a hat shape open toward the vehicle width direction inside. An upper flange portion 20A extends out upward from an upper end portion of the rocker outer panel 20. A lower flange portion 20B extends out downward from a lower end portion of the rocker outer panel 20.

When sectioned along the vehicle width direction, the cross-section profile of the rocker inner panel 22 configures a hat shape open toward the vehicle width direction outside. An upper flange portion 22A extends out upward from an upper end portion of the rocker inner panel 22. A lower flange portion 22B extends out downward from a lower end portion of the rocker inner panel 22.

The upper flange portion 20A of the rocker outer panel 20 and the upper flange portion 22A of the rocker inner panel 22 are joined together. Moreover, the lower flange portion 20B of the rocker outer panel 20 and the lower flange portion 22B of the rocker inner panel 22 are joined together. Joining these together forms a polygonal closed cross-section portion 24 between the rocker outer panel 20 and the rocker inner panel 22. Note that "joining" here refers to spot welding or the like. Similar also applies to references to joining hereafter.

Upward-extending upper flange portions 14A extend out from both vehicle width direction end portions of the floor panel 14 mentioned above. Each upper flange portion 14A is joined to a vertical wall 22C configuring a portion of the rocker inner panel 22 and formed running along the vehicle front-rear direction and the vehicle up-down direction.

Dash Panel Configuration

Explanation follows regarding configuration of a dash panel. A dash panel 26 is provided at a vehicle front-rear direction front side of the floor panel 14. The dash panel 26 may be formed from a single component, or may be configured from two components, namely an upper portion configuring an upper portion of the dash panel 26 and including a vertical wall, and a lower portion configuring a lower portion of the dash panel 26 and joined to the floor panel 14. The lower portion may also be integrally formed to the floor panel 14.

The dash panel 26 partitions the vehicle cabin 12 from a power unit room 28 formed at a vehicle front-rear direction front side of the vehicle cabin 12. The power unit room 28 is capable of housing at least one out of an engine or an electric motor, and may be considered an engine room in cases in which it only houses an engine.

The dash panel 26 is formed in a state inclined toward the vehicle front-rear direction front side on progression toward the vehicle up-down direction upper side. A dash cross member 30 running along the vehicle width direction extends across the dash panel 26 at a specific position in the height direction of the dash panel 26.

Floor Cross Member Configuration

Explanation follows regarding configuration of a floor cross member. Respective floor cross members 32 extend along the vehicle width direction at a vehicle front-rear direction central side of the floor panel 14, with the floor tunnel portion 16 between them. Respective floor cross members 34 extend at a vehicle front-rear direction rear side of the floor cross members 32.

Although not illustrated in the drawings, when sectioned along the vehicle front-rear direction, each of the floor cross members 32 configures a hat shaped cross-section profile opening toward the lower side. Although not illustrated in the drawings, a front flange portion extends out toward the front from a vehicle front-rear direction front end portion of each of the floor cross members 32. A rear flange portion extends out toward the rear from a rear end portion of each of the floor cross members 32. The front flange portions and the rear flange portions are respectively joined to a floor face (front face) 14B of the floor panel 14.

Although not illustrated in the drawings, an upper flange portion extends out upward from a vehicle width direction outer end portion of each of the floor cross members 32. The upper flange portions are joined to the vertical walls 22C of the rocker inner panels 22 of the rockers 18. Moreover, although not illustrated in the drawings, an upper flange portion extends out upward from a vehicle width direction inner end portion of each of the floor cross members 32. The upper flange portions are joined to the outside of the side walls 16A of the floor tunnel portion 16. Note that the floor cross members 34 have substantially the same configuration as the floor cross members 32, and so explanation thereof is omitted.

Reinforcement Member Configuration

Explanation follows regarding configuration of a reinforcement member. Respective reinforcement members 36 are disposed at a front portion of the floor panel 14 in a state angled toward the vehicle width direction inside on progression from a position on the vehicle width direction outside and the vehicle front-rear direction front side of the floor panel 14 (an input portion 40, described later), toward the vehicle front-rear direction rear side. The reinforcement members 36 connect the respective rockers 18 and the floor tunnel portion 16 together.

Specifically, each of the reinforcement members 36 is formed from a steel sheet, and although not illustrated in the drawings, has a cross-section profile configuring a hat shape opening toward the lower side when sectioned along the vehicle front-rear direction. Namely, each of the reinforcement members 36 is one of what is referred to as a framework member. A front flange extends out toward the front from a lower end portion of a vehicle front-rear direction front wall 36A of each of the reinforcement members 36. A rear flange extends out toward the rear from a lower end portion of a vehicle front-rear direction rear wall 36B of each of the reinforcement members 36. The front flanges and the rear flanges are joined to the front face 14B of the floor panel 14.

An upper flange portion 36C1 extends out upward from a vehicle width direction outer end portion of an upper wall portion 36C of each of the reinforcement members 36. The upper flange portion 36C1 is joined to the vertical wall 22C of the rocker inner panel of the rocker 18. An upper flange portion 36C2 extends out upward from a vehicle width direction inner end portion of the upper wall portion 36C of each of the reinforcement members 36. The upper flange portion 36C2 is joined to the outside of the side wall 16A of the floor tunnel portion 16 at the front side of the floor cross member 32.

Note that the reinforcement members 36 are framework members, and portions of inner end portions of the reinforcement members 36 may be joined to the floor cross members 32. Such a configuration enables collision load to be transmitted to the floor cross member in addition to the floor tunnel portion when collision load input to the vehicle in a small overlap collision or an oblique collision is transmitted through the reinforcement member to the floor tunnel portion.

Operation and Advantageous Effects of Vehicle Lower Portion Structure

Next, explanation follows regarding operation and advantageous effects of the vehicle lower portion structure according to the present exemplary embodiment.

Although not illustrated in the drawings, consider, for example, that the vehicle is involved in a frontal collision colliding at the vehicle width direction outside of a front side member, this being vehicle body framework, in what is referred to as a small overlap collision or an oblique collision. Note that in the following explanation, "frontal collision" refers to a small overlap collision or an oblique collision.

In such a frontal collision, collision load is input to the rocker and the dash panel in an oblique direction angled toward a vehicle width direction central side on progression along the vehicle front-rear direction. Accordingly, a bending moment toward the vehicle width direction inside acts on the rocker, and there could be a possibility of the rocker deforming in the vehicle width direction. It is therefore necessary to reinforce the rocker in order to suppress deformation of the rocker.

In the present exemplary embodiment, however, as illustrated in FIG. 1 and FIG. 2A, the reinforcement members 36 are disposed at the front portion of the floor panel 14. The reinforcement members 36 are disposed angled toward the vehicle width direction inside on progression from the position (input portion 40) on the vehicle width direction outside and vehicle front-rear direction front side of the floor panel 14 toward the vehicle front-rear direction rear side. The outer end portions of the reinforcement members 36 are joined to the respective rockers 18, and inner end portions of the reinforcement members 36 are joined to the floor tunnel portion 16.

When the vehicle is involved in a frontal collision, collision load F is input in an oblique direction to the position on the vehicle width direction outside and the vehicle front-rear direction front side of the floor panel 14 (input portion 40). As described above, each reinforcement member 36 connects between the input portion 40 and the floor tunnel portion 16, thereby enabling the collision load F input to the input portion 40 to be effectively transmitted to the floor tunnel portion 16 through the reinforcement member 36. Namely, when the vehicle is involved in a small overlap collision or an oblique collision, the collision load F can be transmitted toward the vehicle front-rear direction rear side, or to the vehicle width direction opposite side to the collision side, through the reinforcement member 36.

This thereby enables the collision load F to be dispersed into the rocker 18 and the floor tunnel portion 16 in a collision with a lateral direction component along the vehicle width direction, such as a small overlap collision or an oblique collision. In particular, this enables deformation of the rocker 18 toward the vehicle width direction inside to be suppressed. Moreover, since the reinforcement member 36 receives the collision load F input to the input portion 40 as axial force, the collision load F can be transmitted to the floor tunnel portion 16 with a minimal amount of reinforcement.

Other Exemplary Embodiments

In the exemplary embodiment described above, the rocker 18 and the floor tunnel portion 16 are connected together by the reinforcement member 36, as illustrated in FIG. 2A. However, the configuration of the reinforcement member 36 is not limited thereto. Explanation follows regarding Modified Examples (1) to (5). In the following explanation, when configuration is substantially the same as that of other exemplary embodiments, the same reference numerals are appended, and explanation thereof may be omitted.

(1) In the present exemplary embodiment, the upper flange portion 36C2 formed to the vehicle width direction inner end portion of each reinforcement member 36 is joined to the outside of the side wall 16A of the floor tunnel portion 16 at the front side of the floor cross member 32. However, a portion of the inner end portion of the reinforcement member 36 may be joined to the floor cross member 32. In such cases, when the collision load F input to the vehicle in a frontal collision is being transmitted through the reinforcement member 36 to the floor tunnel portion 16, the collision load F can also be transmitted to the floor cross member 32 in addition to the floor tunnel portion 16.

In FIG. 2A, the reinforcement member 36 is joined directly to the rocker 18 (input portion 40) and the floor tunnel portion 16. However, in addition to cases in which the reinforcement member 36 is joined directly to the rocker 18 and the floor tunnel portion 16, the present invention also encompasses cases in which the reinforcement member 36 is joined to the rocker 18 and/or to the floor tunnel portion 16 indirectly through another member.

Figure 2D:
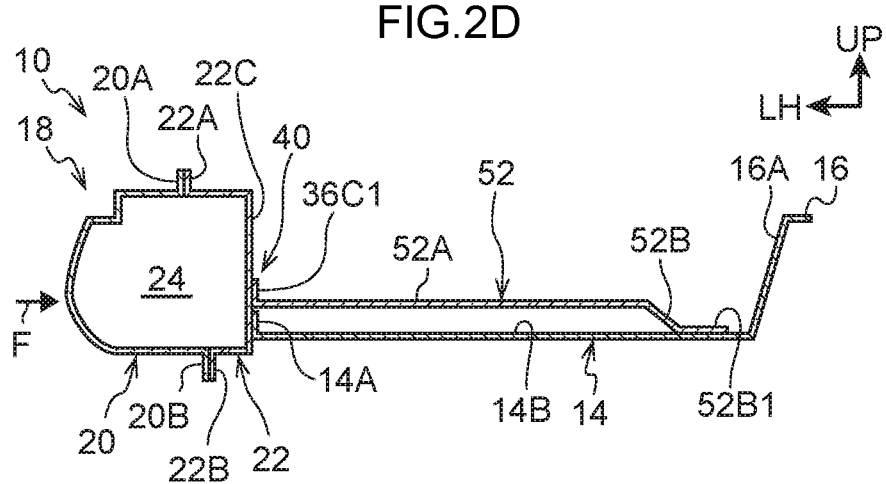
FIG. 2D is a cross-section corresponding to FIG. 2A, illustrating a Modified Example (3) of a vehicle lower portion structure according to the first exemplary embodiment of the present invention.
Figure 3:
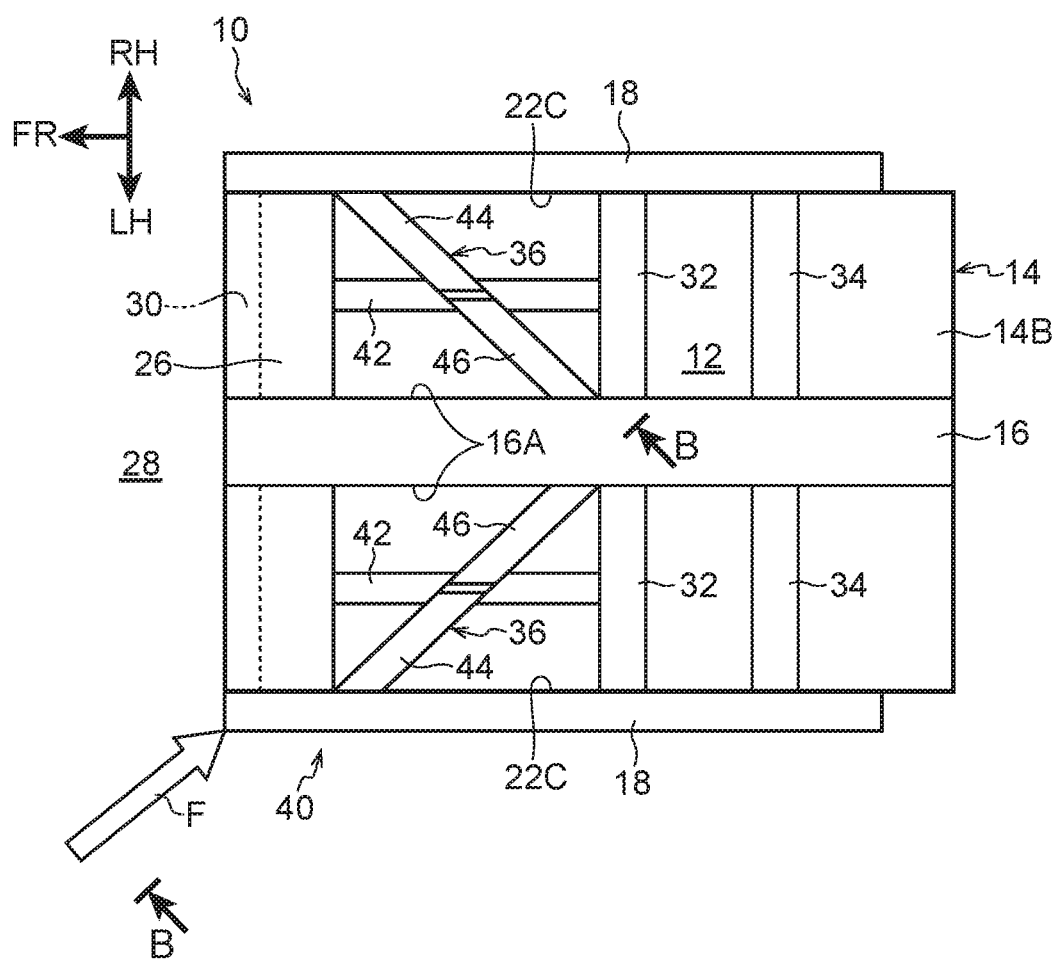
FIG. 3 is a schematic plan view illustrating a Modified Example (1) of the vehicle lower portion structure according to the first exemplary embodiment of the present invention.

For example, as illustrated in FIG. 2B and FIG. 3, in this example, floor reinforcement uppers 42, serving as floor side members extending along the vehicle front-rear direction between the rockers 18 and the floor tunnel portion 16, are provided above the floor panel 14. Note that FIG. 2B is a schematic cross-section illustrating a state sectioned along line B-B in FIG. 3.

Here, each floor reinforcement upper 42 is disposed in a state spanning from the dash panel 26 to the floor cross member 32. However, the floor reinforcement uppers 42 may also be disposed in a state spanning from the dash panel 26 to the floor cross members 34.

When sectioned along the vehicle width direction, the cross-section profile of the floor reinforcement upper 42 configures, for example, a hat shape open toward the lower side. Although not illustrated in the drawings, a front flange portion extends out toward the front from a vehicle front-rear direction front end portion of an upper wall portion 42A of the floor reinforcement upper 42. A rear flange portion extends out toward the rear from a rear end portion of the upper wall portion 42A of the floor reinforcement upper 42. The front flange portion is joined to the dash panel 26, and the rear flange portion is joined to the floor cross member 32.

An outer flange portion 42B extends out horizontally toward the rocker 18 from a vehicle width direction outer end portion of the floor reinforcement upper 42. An inner flange portion 42C extends out horizontally toward the floor tunnel portion 16 from a vehicle width direction inner end portion of the floor reinforcement upper 42. The outer flange portion 42B and the inner flange portion 42C are each joined to the front face 14B of the floor panel 14.

In the present exemplary embodiment, each of the reinforcement members 36 is split into a reinforcement member 44, serving as a first reinforcement member, and a reinforcement member 46, serving as a second reinforcement member. The reinforcement member 44 connects the rocker 18 to the floor reinforcement upper 42, and the reinforcement member 46 connects the floor reinforcement upper 42 to the floor tunnel portion 16.

Specifically, an upper flange portion 44A1 extends out upward from a vehicle width direction outer end portion of the an upper wall portion 44A of the reinforcement member 44. The upper flange portion 44A1 is joined to the vertical wall 22C of the rocker inner panel 22 of the rocker 18. Moreover, a flange portion 44A2 extends out substantially horizontally from a vehicle width direction inner end portion of the upper wall portion 44A of the reinforcement member 44, so as to overlap with a portion of a side wall 42D of the floor reinforcement upper 42. The flange portion 44A2 is joined to the upper wall portion 42A of the floor reinforcement upper 42.

A flange portion 46A1 extends out substantially horizontally from a vehicle width direction inner end portion of an upper wall portion 46A of the reinforcement member 46, so as to overlap with a portion of a side wall 42D of the floor reinforcement upper 42. The flange portion 46A1 is joined to the upper wall portion 42A of the floor reinforcement upper 42. Moreover, an upper flange portion 46A2 extends out upward from a vehicle width direction outer end portion of the upper wall portion 46A of the reinforcement member 46. The upper flange portion 46A2 is joined to the outside of the side wall 16A of the floor tunnel portion 16. Namely, in the present exemplary embodiment, the reinforcement member 36 (reinforcement members 44, 46) is indirectly joined to the rocker 18 and the floor tunnel portion 16 through the floor reinforcement upper 42.

Here, the floor reinforcement upper 42 is disposed running along the vehicle front-rear direction above the floor panel 14, thereby enabling the rigidity of the floor panel 14 itself to be raised. Joining the reinforcement member 44 to the floor reinforcement upper 42 enables a portion of the oblique direction collision load F input to the input portion 40 in a vehicle frontal collision to be transmitted to the floor reinforcement upper 42.

The flange portion 44A2 of the reinforcement member 44 extends out substantially horizontally so as to overlap with a portion of the side wall 42D of the floor reinforcement upper 42. The flange portion 44A2 is joined to the upper wall portion 42A of the floor reinforcement upper 42.

The flange portion 46A1 of the reinforcement member 46, and the upper flange portion 46A2 of the reinforcement member 46, respectively extend out such that they both overlap with a portion of the side walls 42D of the floor reinforcement upper 42. This thereby enables collision load (<F) transmitted to the reinforcement member 44 to be effectively transmitted to the floor reinforcement upper 42 and the reinforcement member 46.

Note that explanation has been given regarding an example in which the floor reinforcement upper 42 spans from the dash panel 26 to the floor cross member 32. However, from the perspective that it is sufficient that the present exemplary embodiment enables the oblique direction collision load F to be transmitted to the floor tunnel portion 16, the floor reinforcement upper 42 need not necessarily span from the dash panel 26 to the floor cross member 32. Accordingly, the floor reinforcement upper 42 may be configured spanning between the reinforcement member 36 and the floor cross member 32.

(2) In FIG. 2B, the reinforcement member 36 is split into the reinforcement member 44 and the reinforcement member 46 due to joining the reinforcement member 36 to the floor reinforcement upper 42 that extends along the vehicle front-rear direction between the rocker 18 and the floor tunnel portion 16. However, there is no limitation thereto, since it is sufficient that the reinforcement member 36 is respectively joined to the rocker 18, the floor reinforcement upper 42, and the floor tunnel portion 16.

For example, as illustrated in FIG. 2C, in a reinforcement member 48, an upper flange portion 48A1 extends out upward from a vehicle width direction outer end portion of an upper wall portion 48A, and the upper flange portion 48A1 is joined to the vertical wall 22C of the rocker inner panel 22 of the rocker 18. A flange portion 48A2 extends out from a vehicle width direction inner end portion of the upper wall portion 48A of the reinforcement member 48, and the flange portion 48A2 is joined to the outside of the side wall 16A of the floor tunnel portion 16.

In the present exemplary embodiment, a projection portion 50 that projects out upwards so as to conform with the shape of the floor reinforcement upper 42 and overlap with portions of the side walls 42D, is provided at a length direction central portion of the reinforcement member 48. An upper wall portion 50A of the projection portion 50 is joined to the upper wall portion 42A of the floor reinforcement upper 42. This thereby enables the reinforcement member 48 to be joined to the floor reinforcement upper 42 in a non-split state.

In the present exemplary embodiment, the reinforcement member 48 is provided with the projection portion 50, and the upper wall portion 50A of the projection portion 50 is joined to the upper wall portion 42A of the floor reinforcement upper 42. This thereby enables a portion of the oblique direction collision load F input to the input portion 40 in a frontal collision of the vehicle to be transmitted to the floor reinforcement upper 42 through the projection portion 50.

(3) Other than FIG. 2B, for example as illustrated in FIG. 2D, an inclined wall 52B may be formed in the vicinity of the floor tunnel portion 16, inclining downward on progression toward the floor tunnel portion 16 side from a vehicle width direction inner end portion of an upper wall portion 52A of a reinforcement member 52. The inclined wall 52B absorbs a height direction gap between the upper wall portion 52A of the reinforcement member 52 and the front face 14B of the floor panel 14.

A flange portion 52B1 extends out horizontally from a lower end portion of the inclined wall 52B toward the floor tunnel portion 16 side. The flange portion 52B1 is joined to the front face 14B of the floor panel 14. Namely, in the present exemplary embodiment, the reinforcement member 52 is indirectly joined to the rocker 18 and the floor tunnel portion 16 through the floor panel 14.

The present exemplary embodiment makes it possible to weld a vehicle width direction inner end portion of the reinforcement member 52 along the vehicle up-down direction, thereby increasing productivity in comparison to when the upper flange portion 36C2 is joined to the side wall 16A of the floor tunnel portion 16, as in the reinforcement member 36 illustrated in FIG. 2A.

Figure 2E:
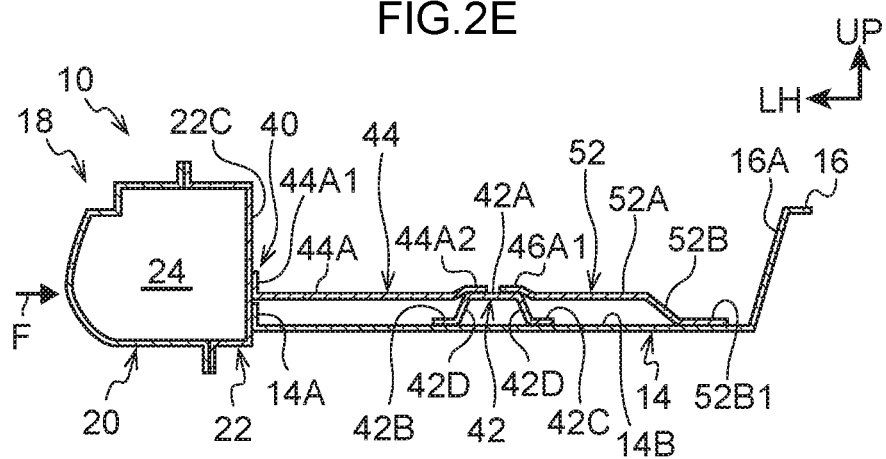
FIG. 2E is a cross-section corresponding to FIG. 2B, illustrating a Modified Example (3) of a vehicle lower portion structure according to the first exemplary embodiment of the present invention.
Figure 2F:
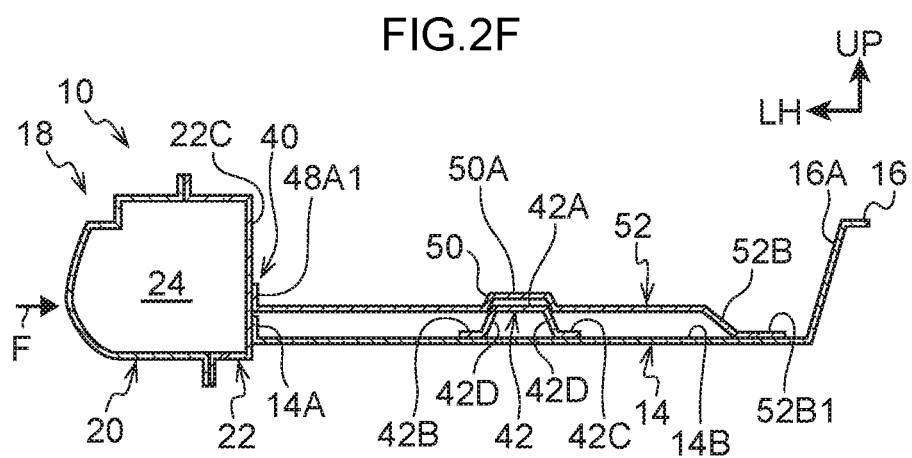
FIG. 2F is a cross-section corresponding to FIG. 2C, illustrating a Modified Example (3) of a vehicle lower portion structure according to the first exemplary embodiment of the present invention.

Note that as illustrated in FIG. 2E and FIG. 2F, such a configuration may also be applied in cases in which the floor reinforcement upper 42 extends along the vehicle front-rear direction between the rocker 18 and the floor tunnel portion 16. In FIG. 2E and FIG. 2F, the methods for joining the reinforcement member 52 and the floor reinforcement upper 42 together are substantially the same as those illustrated in FIG. 2B and FIG. 2C respectively, and so explanation thereof is omitted.

Figure 4A:
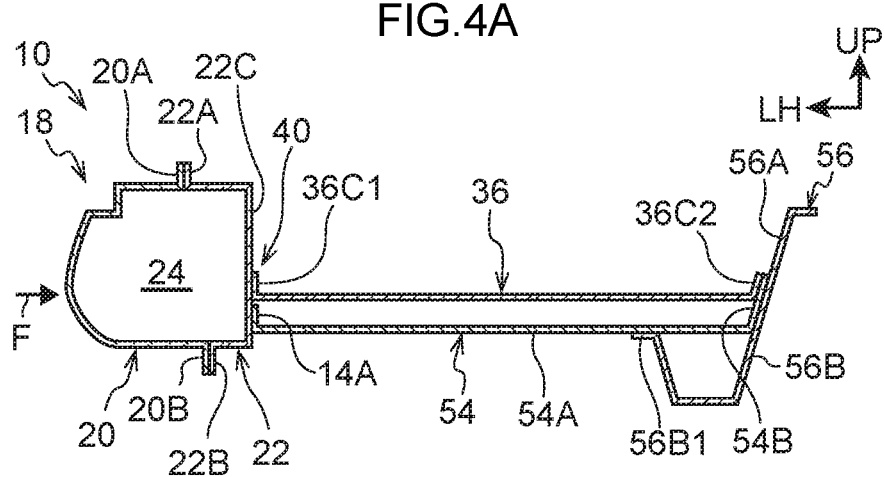
FIG. 4A is a cross-section corresponding to FIG. 2A, illustrating a Modified Example (4) of a vehicle lower portion structure according to the first exemplary embodiment of the present invention.

(4) In FIG. 2A, the floor tunnel portion 16 extending in the vehicle front-rear direction is integrally formed at the vehicle width direction central portion of the floor panel 14. However, the configurations of the floor panel and the floor tunnel portion are not limited thereto. For example, as illustrated in FIG. 4A, a floor panel 54 may have a split configuration centered on a floor tunnel portion 56.

Here, the cross-section profile of the floor tunnel portion 56 taken along the vehicle width direction forms a mountain portion 56A opening toward the lower side, and a valley portion 56B formed at a base portion of the mountain portion 56A. A flange portion 56B1 extends out in a horizontal direction from an outer edge portion of the valley portion 56B, and the flange portion 56B1 is joined to a back face 54A of the floor panel 54.

An upper flange portion 54B extends out upward on the floor tunnel portion 56 side of the floor panel 54. The upper flange portion 54B is joined to the outside of the mountain portion 56A of the floor tunnel portion 56. The upper flange portion 36C2 of the reinforcement member 36 is joined to the upper flange portion 54B. Note that forming the valley portion 56B to the floor tunnel portion 56 increases the rigidity of the floor tunnel portion 56 itself.

Figure 4B:
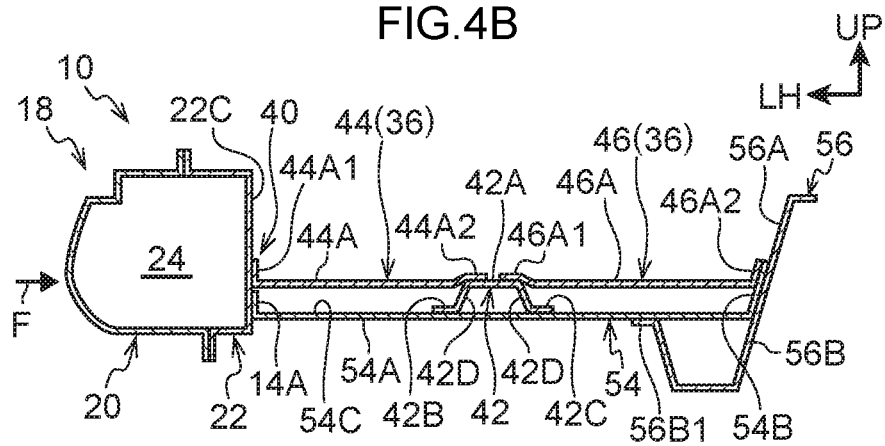
FIG. 4B is a cross-section corresponding to FIG. 2B, illustrating a Modified Example (4) of a vehicle lower portion structure according to the first exemplary embodiment of the present invention.
Figure 4C:
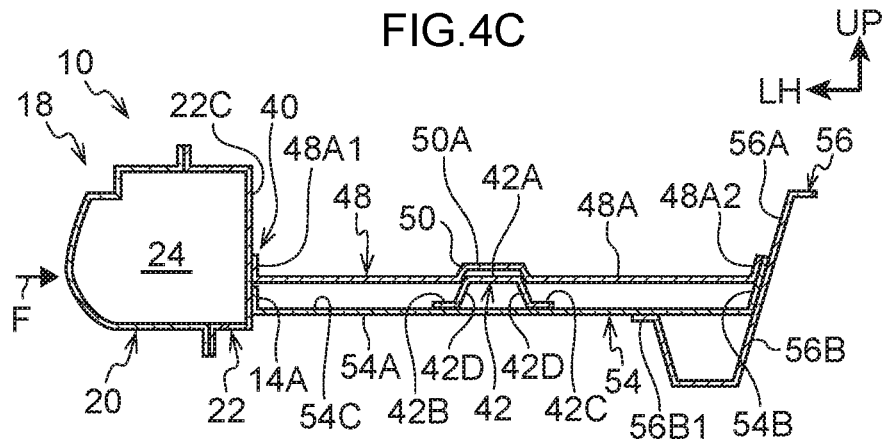
FIG. 4C is a cross-section corresponding to FIG. 2C, illustrating a Modified Example (4) of a vehicle lower portion structure according to the first exemplary embodiment of the present invention.

Note that as illustrated in FIG. 4B and FIG. 4C, such a configuration may also be applied in cases in which the floor reinforcement upper 42 extends along the vehicle front-rear direction between the rocker 18 and the floor tunnel portion 56.

Figure 4D:
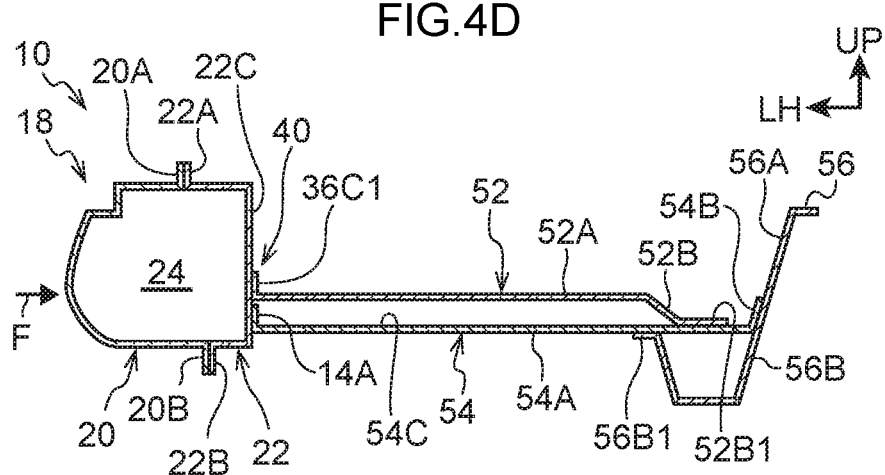
FIG. 4D is a cross-section corresponding to FIG. 2D, illustrating a Modified Example (4) of a vehicle lower portion structure according to the first exemplary embodiment of the present invention.

Moreover, as illustrated in FIG. 4D, the configuration of the floor panel 54 and the floor tunnel portion 56 may be applied in place of the floor panel 14 (including the floor tunnel portion 16) illustrated in FIG. 2D. Note that the reinforcement member 52 is formed with the inclined wall 52B inclining downward on progression toward the floor tunnel portion 56 side in the vicinity of the floor tunnel portion 56. The flange portion 52B1 extends out from the lower end portion of the inclined wall 52B, and the flange portion 52B1 is at a position corresponding to the valley portion 56B of the floor tunnel portion 56. The flange portion 52B1 is joined to a front face 54C of the floor panel 54.

Figure 4E:
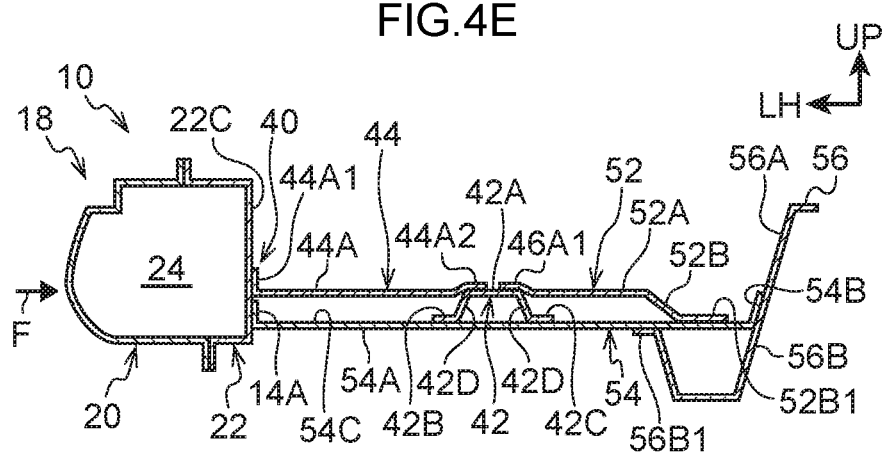
FIG. 4E is a cross-section corresponding to FIG. 2E, illustrating a Modified Example (4) of a vehicle lower portion structure according to the first exemplary embodiment of the present invention.
Figure 4F:
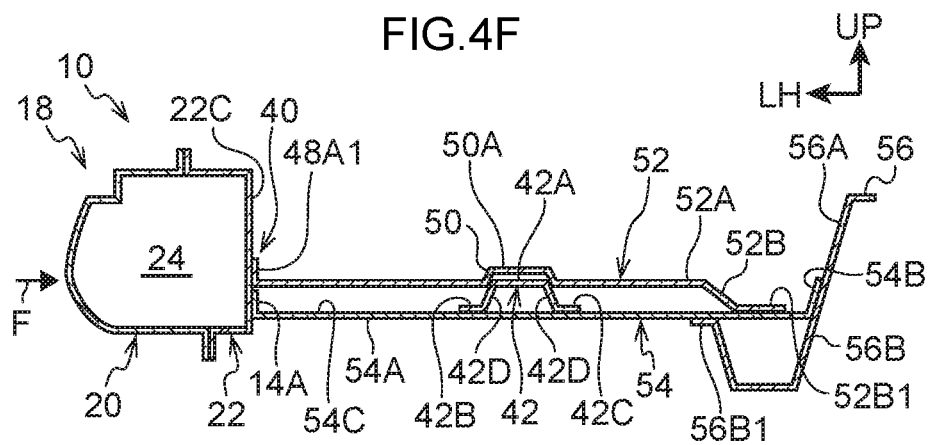
FIG. 4F is a cross-section corresponding to FIG. 2F, illustrating a Modified Example (4) of a vehicle lower portion structure according to the first exemplary embodiment of the present invention.

Moreover, as illustrated in FIG. 4E and FIG. 4F, the floor panel 54 and the floor tunnel portion 56 may be respectively applied in place of the floor panel 14 illustrated in FIG. 2E and FIG. 2F.

Figure 5A:
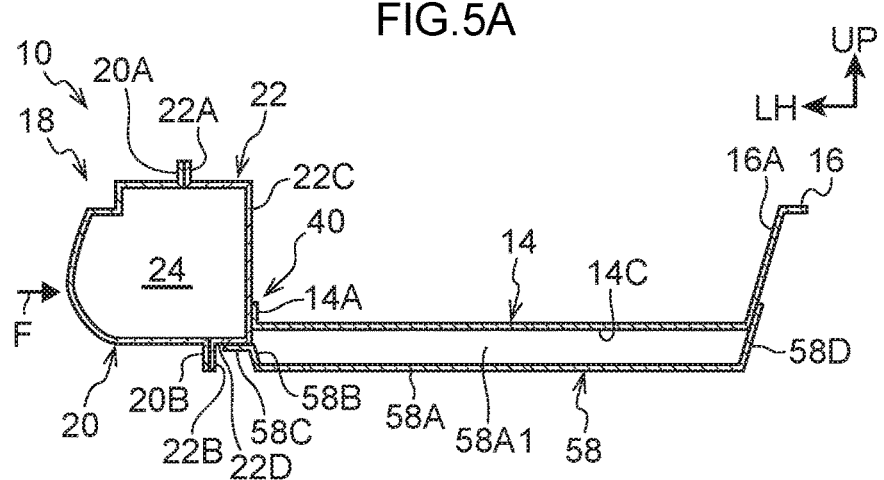
FIG. 5A is a cross-section corresponding to FIG. 2A, illustrating a Modified Example (5) of a vehicle lower portion structure according to the first exemplary embodiment of the present invention.

(5) In FIG. 2A, the reinforcement member 36 is disposed above the floor panel 14; however, there is no limitation thereto. For example, as illustrated in FIG. 5A, a reinforcement member 58 may be disposed below the floor panel 14.

When sectioned along the vehicle front-rear direction, the cross-section profile of the reinforcement member 58 forms a hat shape opening toward the upper side. A front flange extends out toward the front from a lower end portion of a vehicle front-rear direction front wall 58A1 of the reinforcement member 58. A rear flange extends out toward the rear from a lower end portion of a vehicle front-rear direction rear wall (not illustrated in the drawings) of the reinforcement member 58. The front flange and the rear flange are joined to a back face 14C of the floor panel 14.

An inclined wall 58B that is inclined upward on progression toward the rocker 18 side is formed from a vehicle width direction outer end portion of a lower wall portion 58A of the reinforcement member 58. A flange portion 58C extends out horizontally toward the rocker 18 from a lower end portion of the inclined wall 58B, and the flange portion 58C is joined to a lower wall 22D of the rocker inner panel 22 of the rocker 18. A vehicle width direction inner end portion of the lower wall portion 58A of the reinforcement member 58 is formed with an upper flange 58D that heads upward, and the upper flange 58D is joined to the inside of the side wall 16A of the floor tunnel portion 16.

Disposing the reinforcement member 58 below the floor panel 14 enables a larger space inside the vehicle cabin 12 than when the reinforcement member 36 is disposed above the floor panel 14 as illustrated in FIG. 2A. Welding along the vehicle up-down direction is also enabled at the vehicle width direction outer end portion of the reinforcement member 58. This thereby improves productivity in comparison to cases in which the upper flange portion 36C1 is joined to the vertical wall 22C of the rocker inner panel 22 of the rocker 18, as in the reinforcement member 36 illustrated in FIG. 2A.

Figure 5B:
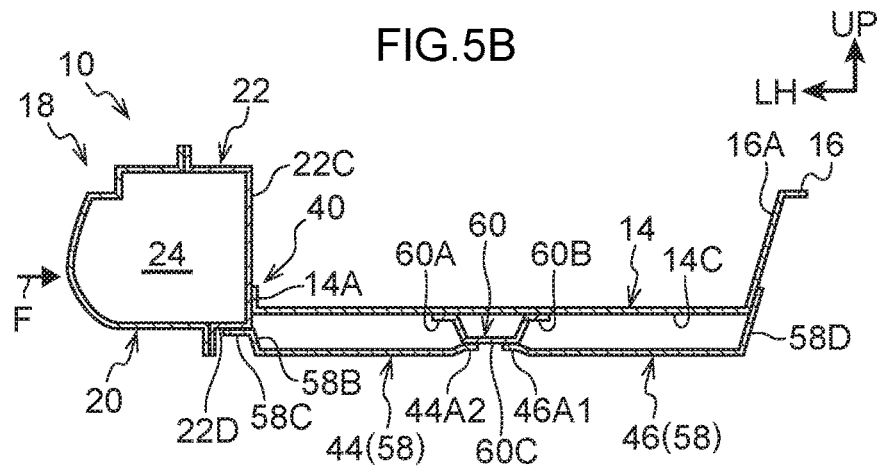
FIG. 5B is a cross-section corresponding to FIG. 2B, illustrating a Modified Example (5) of a vehicle lower portion structure according to the first exemplary embodiment of the present invention.

Moreover, as illustrated in FIG. 5B, a floor reinforcement lower 60, serving as a floor side member running along the vehicle front-rear direction between the rocker 18 and the floor tunnel portion 16, may be disposed at the back face 14C of the floor panel 14.

When sectioned along the vehicle width direction, the cross-section profile of the floor reinforcement lower 60 configures, for example, a hat shape open toward the lower side. An outer flange portion 60A extends out horizontally toward the rocker 18 from a vehicle width direction outer end portion of the floor reinforcement lower 60. An inner flange portion 60B extends out horizontally toward the floor tunnel portion 16 side from a vehicle width direction inner end portion of the floor reinforcement lower 60. The outer flange portion 60A and the inner flange portion 60B are respectively joined to the back face 14C of the floor panel 14.

In the present exemplary embodiment, since the reinforcement member 58 is disposed below the floor panel 14, the reinforcement member 58 is split into the reinforcement member 44 and the reinforcement member 46. The reinforcement member 44 connects the rocker 18 and the floor reinforcement lower 60 together. The reinforcement member 46 connects the floor reinforcement lower 60 and the floor tunnel portion 16 together.

Figure 5C:
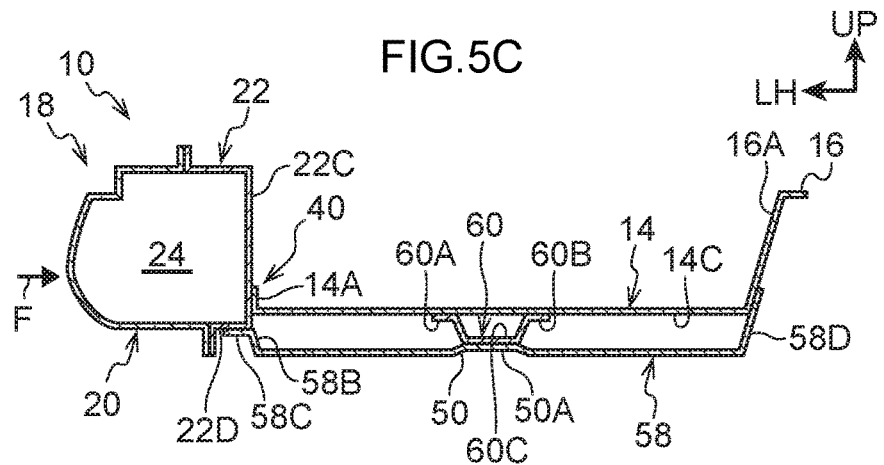
FIG. 5C is a cross-section corresponding to FIG. 2C, illustrating a Modified Example (5) of a vehicle lower portion structure according to the first exemplary embodiment of the present invention.

As illustrated in FIG. 5C, a projection portion 50 that projects out upward may be provided at a length direction central portion of the reinforcement member 58, and an upper wall portion 50A of the projection portion 50 may be joined to a lower wall portion 60C of the floor reinforcement lower 60. This thereby enables the reinforcement member 58 to be joined to the floor reinforcement lower 60 in a non-split state.

Providing the projection portion 50 to the reinforcement member 58, and joining the upper wall portion 50A of the projection portion 50 to the lower wall portion 60C of the floor reinforcement lower 60 in this manner, enables a portion of the oblique direction collision load F input to the input portion 40 in a vehicle frontal collision to be transmitted to the floor reinforcement lower 60 through the projection portion 50.

In the present exemplary embodiment, as illustrated in FIG. 5A, the reinforcement member 58 is disposed below the floor panel 14. However, in consideration of the load transmission efficiency from the rocker 18 to the floor tunnel portion 16, the configuration in which the reinforcement member 48 is disposed above the floor panel 14, as illustrated in FIG. 2A, is preferable.

Figure 5D:
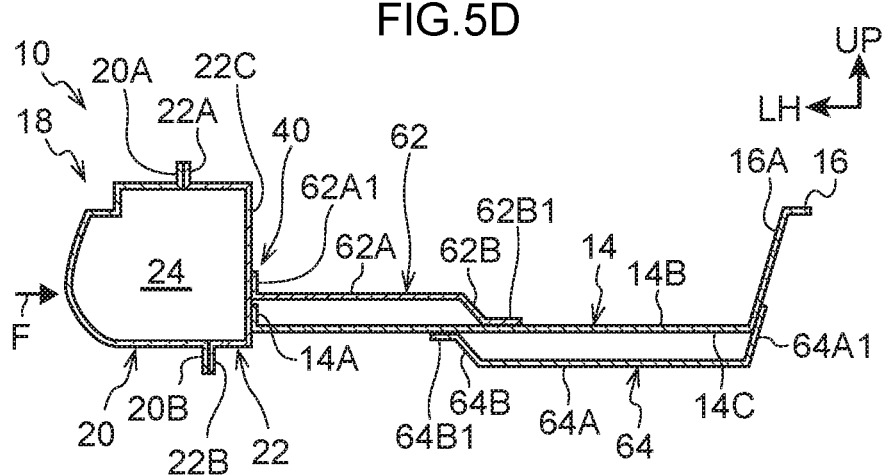
FIG. 5D is a cross-section corresponding to FIG. 2D, illustrating a Modified Example (5) of a vehicle lower portion structure according to the first exemplary embodiment of the present invention.

Accordingly, as illustrated in FIG. 5D, a reinforcement member may be split into a reinforcement member 62 and a reinforcement member 64. When sectioned along the vehicle width direction, the cross-section profile of the reinforcement member 62 configures a hat shape opening toward the lower side. An upper flange portion 62A1 extends out upward from a vehicle width direction outer end portion of an upper wall portion 62A of the reinforcement member 62, and the upper flange portion 62A1 is joined to the vertical wall 22C of the rocker inner panel 22 of the rocker 18. An inclined wall 62B inclining toward the lower side on progression toward the floor tunnel portion 16 side is formed at a vehicle width direction inner end side of the upper wall portion 62A of the reinforcement member 62. A flange portion 62B1 extends out horizontally toward the floor tunnel portion 16 side from a lower end portion of the inclined wall 62B, and the flange portion 62B1 is joined to the front face 14B of the floor panel 14.

When sectioned along the vehicle width direction, the cross-section profile of the reinforcement member 64 configures a hat shape opening toward the upper side. An inclined wall 64B inclining upward on progression toward the rocker 18 side is formed at a vehicle width direction outer end portion of a lower wall 64A of the reinforcement member 64 so as to correspond the inclined wall 62B of the reinforcement member 62 in the vehicle up-down direction. A flange portion 64B1 extends out horizontally toward the rocker 18 side from an upper end portion of the inclined wall 64B. The flange portion 64B1 is joined to the back face 14C of the floor panel 14. An upper flange portion 64A1 is formed extending out upward from a vehicle width direction inner end portion of the lower wall 64A of the reinforcement member 64. The upper flange portion 64A1 is joined to the inside of the side wall 16A of the floor tunnel portion 16.

Accordingly, the oblique direction collision load F input to the input portion 40 in a vehicle frontal collision is transmitted to the reinforcement member 64 disposed below the floor panel 14 from the reinforcement member 62 disposed above the floor panel 14 and through the floor panel 14. Moreover, the oblique direction collision load F can also be transmitted through the reinforcement member 64 to the floor tunnel portion 16. This thereby enables, in the present exemplary embodiment, the space inside the vehicle cabin 12 to be made larger, and also enables improved load transmission efficiency.

Figure 5E:
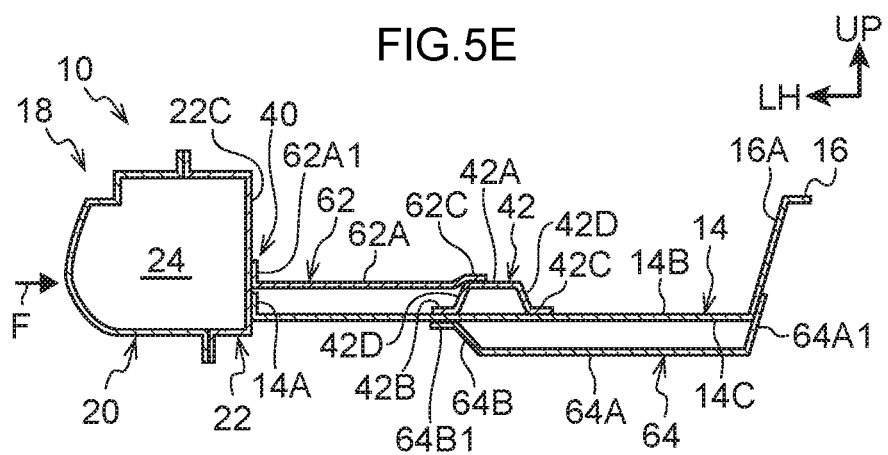
FIG. 5E is a cross-section corresponding to FIG. 2E, illustrating a Modified Example (5) of the vehicle lower portion structure according to the first exemplary embodiment of the present invention.

Note that the inclined wall 62B is formed at the vehicle width direction inner end side of the reinforcement member 62. However, as illustrated in FIG. 5E, the inclined wall 62B is not formed in cases in which the floor reinforcement upper 42 is disposed at the front face 14B of the floor panel 14. In such cases, a vehicle width direction inner end portion 62C of the upper wall portion 62A of the reinforcement member 62 is joined to the upper wall portion 42A of the floor reinforcement upper 42. The floor reinforcement upper 42 is disposed so as to correspond with the reinforcement member 64 in the vehicle up-down direction.

Figure 5F:
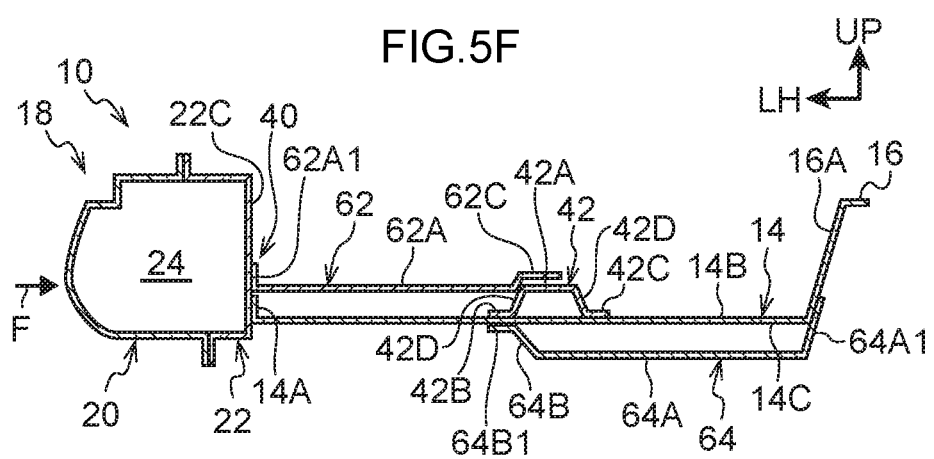
FIG. 5F is a cross-section corresponding to FIG. 2F, illustrating a Modified Example (5) of the vehicle lower portion structure according to the first exemplary embodiment of the present invention.

As illustrated in FIG. 5F, the vehicle width direction inner end portion 62C of the reinforcement member 62 may be formed in a crank shape conforming to the shape of the floor reinforcement upper 42. Increasing the overlapping amount between the inner end portion 62C of the reinforcement member 62 and the floor reinforcement upper 42 in this manner enables effective transmission of collision load (<F) transmitted to the reinforcement member 62 to the floor reinforcement upper 42. Note that here, the inner end portion 62C is illustrated in a state separated from the upper wall portion 42A.

Figure 6A:
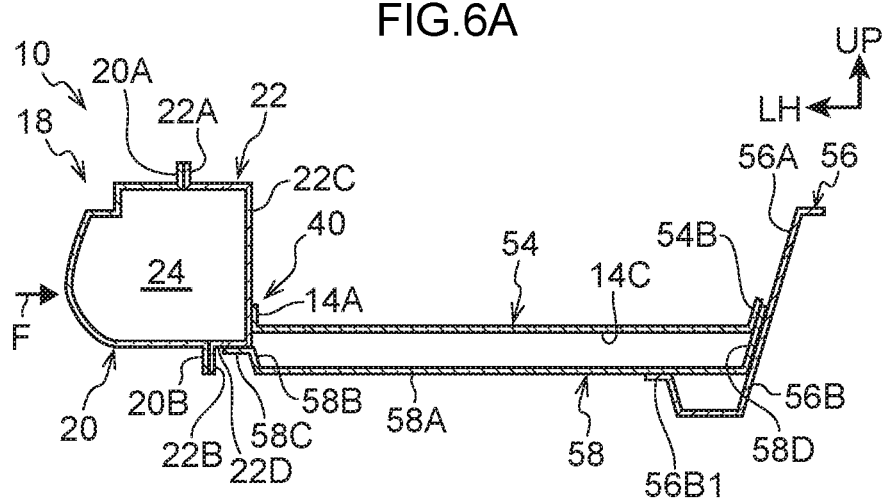
FIG. 6A is a cross-section corresponding to FIG. 5A, illustrating a Modified Example (6) of a vehicle lower portion structure according to the first exemplary embodiment of the present invention.
Figure 6B:
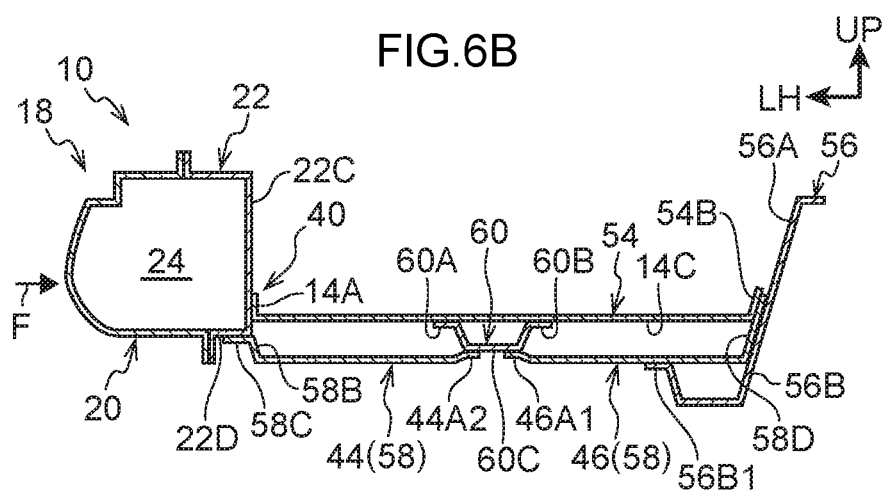
FIG. 6B is a cross-section corresponding to FIG. 5B, illustrating a Modified Example (6) of a vehicle lower portion structure according to the first exemplary embodiment of the present invention.
Figure 6C:
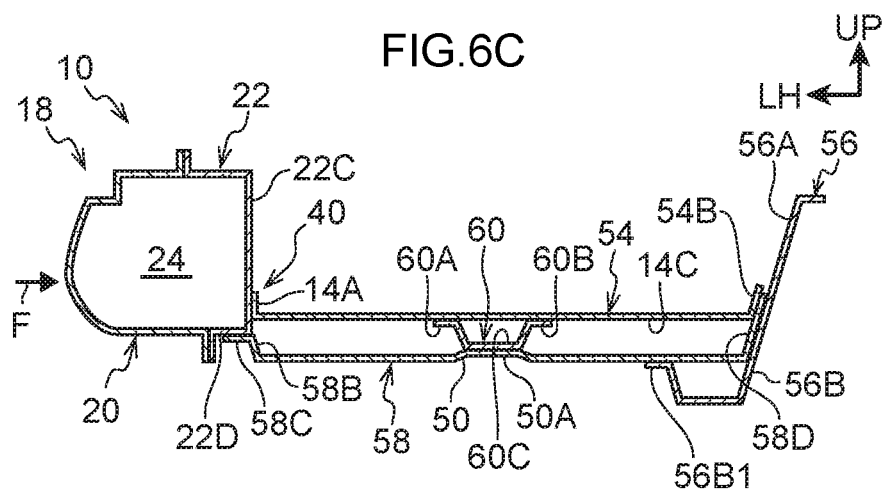
FIG. 6C is a cross-section corresponding to FIG. 5C, illustrating a Modified Example (6) of a vehicle lower portion structure according to the first exemplary embodiment of the present invention.
Figure 6D:
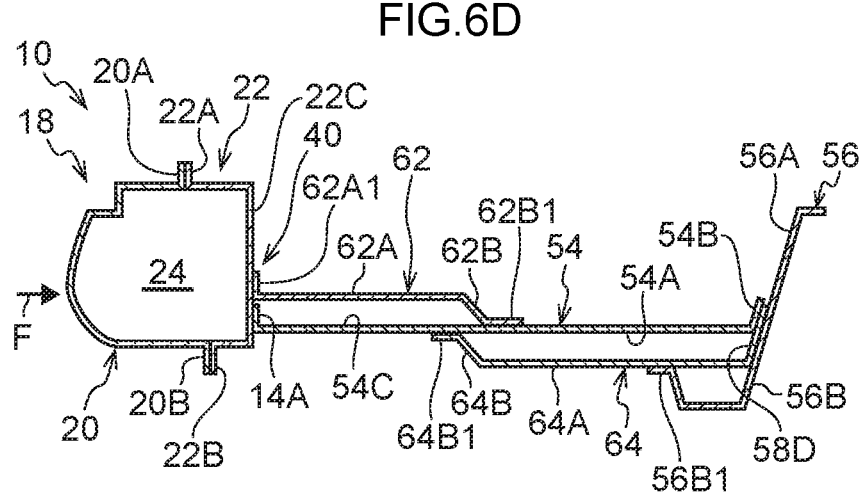
FIG. 6D is a cross-section corresponding to FIG. 5D, illustrating a Modified Example (6) of a vehicle lower portion structure according to the first exemplary embodiment of the present invention.
Figure 6E:
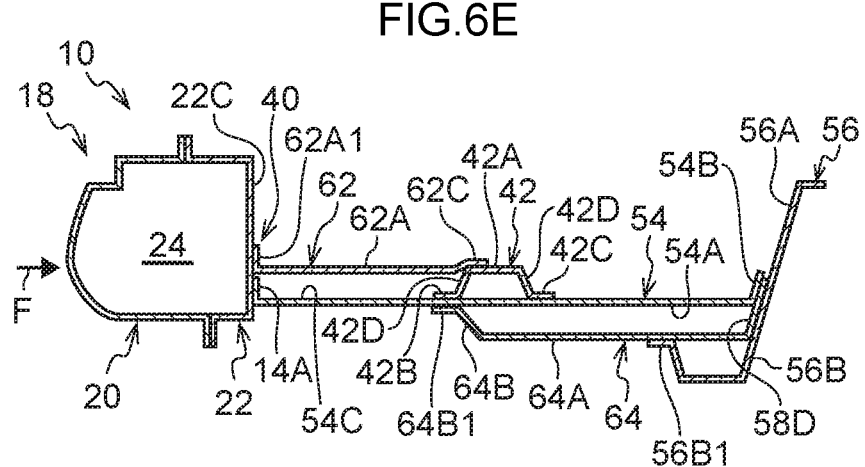
FIG. 6E is a cross-section corresponding to FIG. 5E, illustrating a Modified Example (6) of a vehicle lower portion structure according to the first exemplary embodiment of the present invention.
Figure 6F:
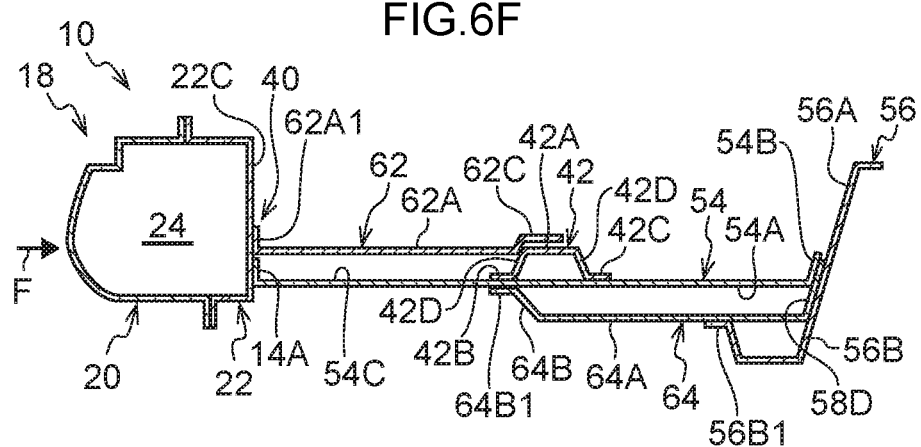
FIG. 6F is a cross-section corresponding to FIG. 5F, illustrating a Modified Example (6) of a vehicle lower portion structure according to the first exemplary embodiment of the present invention.

(6) Moreover, in each of the exemplary embodiments described above (FIG. 5A to FIG. 5F), the floor panel 54 may be applied with a split configuration centered on the floor tunnel portion 56, as illustrated in FIG. 6A to FIG. 6F respectively. In such cases, for example, the upper flange 58D formed to the vehicle width direction inner end portion of the reinforcement member 58 illustrated in FIG. 6A is joined to the outside of the mountain portion 56A of the floor tunnel portion 56. The upper flange portion 54B of the floor panel 54 is joined to the upper flange 58D.

As illustrated in FIG. 6B to FIG. 6F, the floor panel 54 and the floor tunnel portion 56 may respectively be applied in place of the floor panel 14 illustrated in FIG. 5B to FIG. 5F.

Figure 7A:
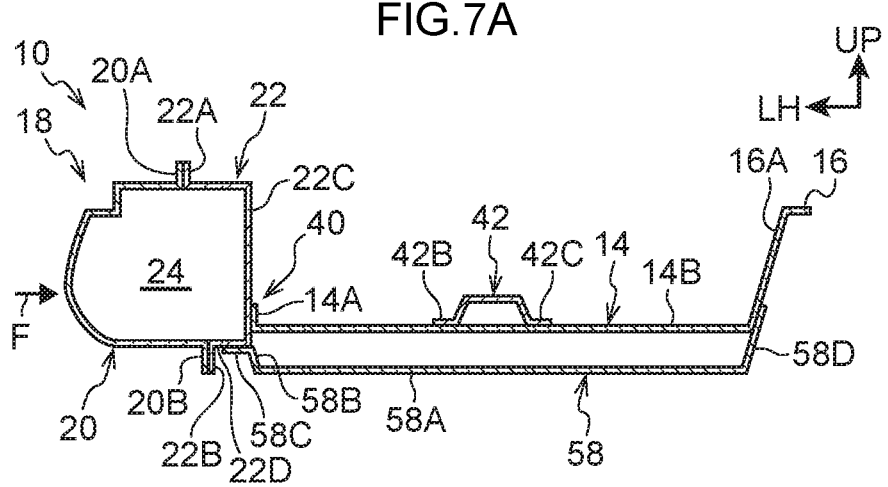
FIG. 7A is a cross-section corresponding to FIG. 5A, illustrating a Modified Example (7) of a vehicle lower portion structure according to the first exemplary embodiment of the present invention.
Figure 7B:
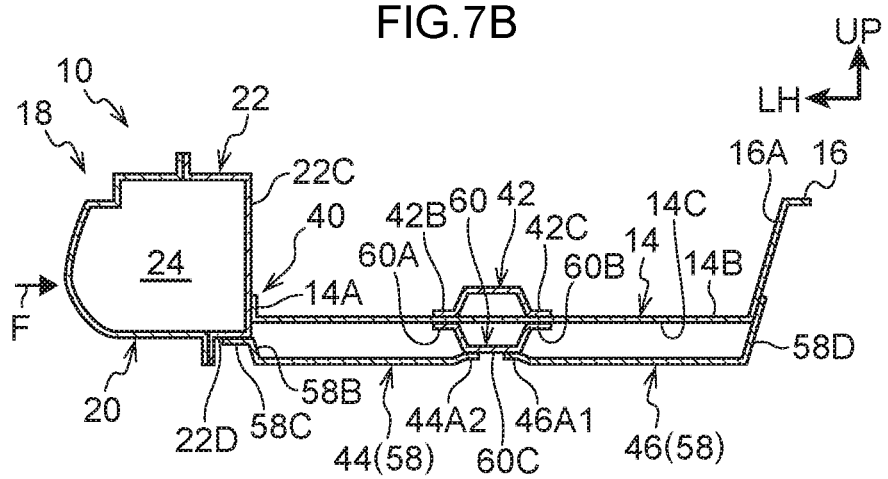
FIG. 7B is a cross-section corresponding to FIG. 5B, illustrating a Modified Example (7) of a vehicle lower portion structure according to the first exemplary embodiment of the present invention.
Figure 7C:
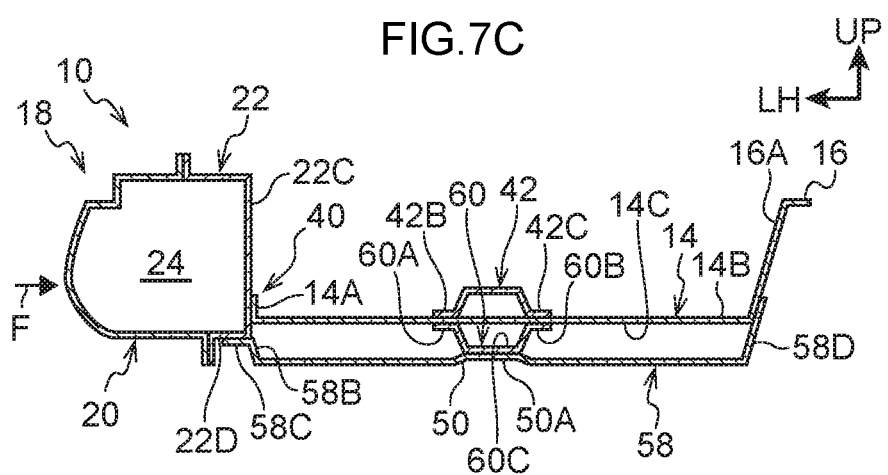
FIG. 7C is a cross-section corresponding to FIG. 5C, illustrating a Modified Example (7) of a vehicle lower portion structure according to the first exemplary embodiment of the present invention.

(7) Moreover, in the present exemplary embodiment, as illustrated in FIG. 5A to FIG. 5C, the reinforcement member 58 is disposed below the floor panel 14, and the space inside the vehicle cabin 12 is made larger. However, as illustrated in FIG. 7A to FIG. 7C respectively, configuration may be made in which the floor reinforcement uppers 42 are disposed running along the vehicle front-rear direction over the front face 14B of the floor panel 14. This thereby enables the rigidity of the floor panel 14 itself to be raised.

Figure 7D:
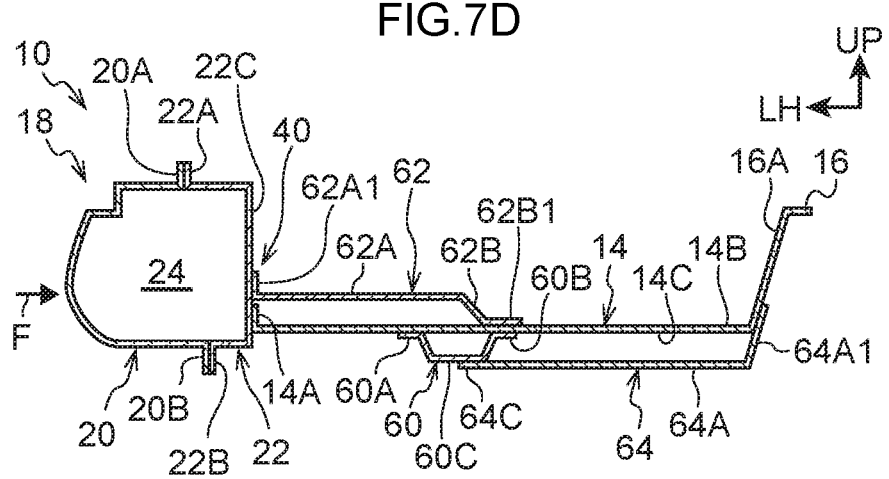
FIG. 7D is a cross-section corresponding to FIG. 5D, illustrating a Modified Example (7) of a vehicle lower portion structure according to the first exemplary embodiment of the present invention.
Figure 7E:
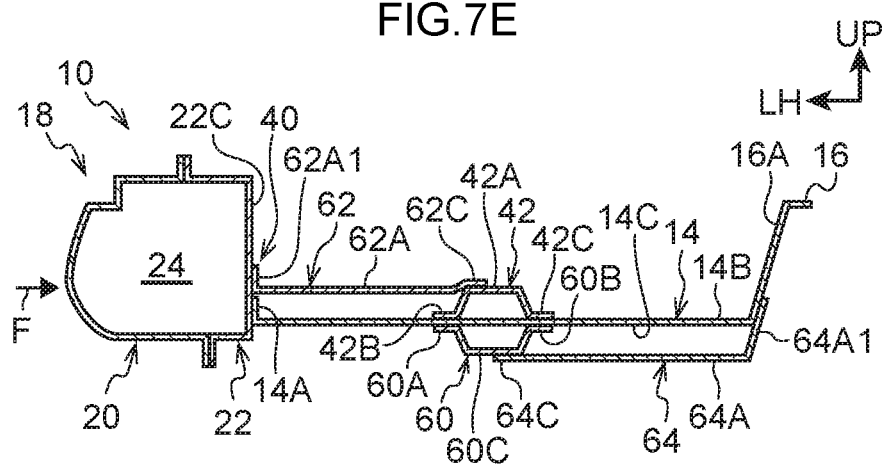
FIG. 7E is a cross-section corresponding to FIG. 5E, illustrating a Modified Example (7) of a vehicle lower portion structure according to the first exemplary embodiment of the present invention.
Figure 7F:
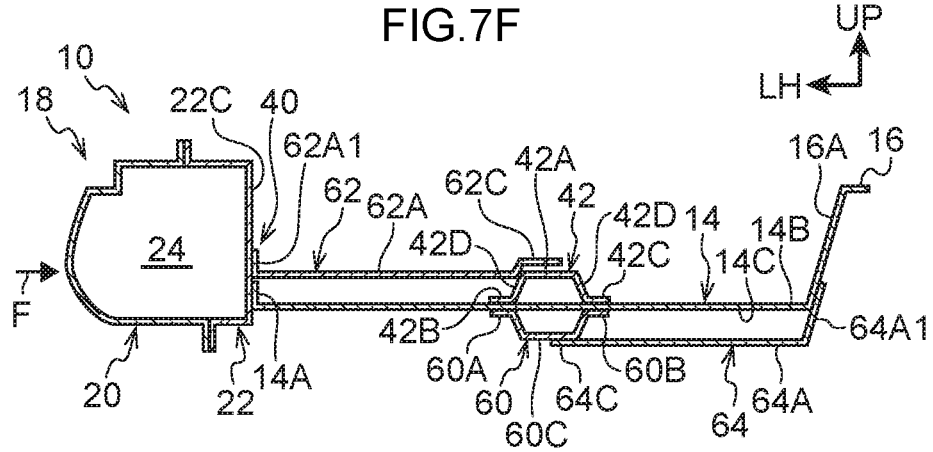
FIG. 7F is a cross-section corresponding to FIG. 5F, illustrating a Modified Example (7) of a vehicle lower portion structure according to the first exemplary embodiment of the present invention.

As illustrated in FIG. 5D, in the present exemplary embodiment, a reinforcement member is split into the reinforcement member 62 and the reinforcement member 64. The reinforcement member 62 is joined to the front face 14B of the floor panel 14, and the reinforcement member 64 is joined to the back face 14C of the floor panel 14. However, as illustrated in FIG. 7D, the floor reinforcement lower 60 may be disposed running along the vehicle front-rear direction at the back face 14C of the floor panel 14. In such a configuration, a flange portion 64C extends out horizontally toward the rocker 18 side from a vehicle width direction outer end portion of the lower wall 64A of the reinforcement member 64, and the flange portion 64C is joined to the lower wall portion 60C of the floor reinforcement lower 60. Note that in FIG. 7E and FIG. 7F, the configuration of the reinforcement member 64 and the floor reinforcement lower 60 in FIG. 7D is applied to the respective configurations illustrated in FIG. 5E and FIG. 5F.

Figure 8D:
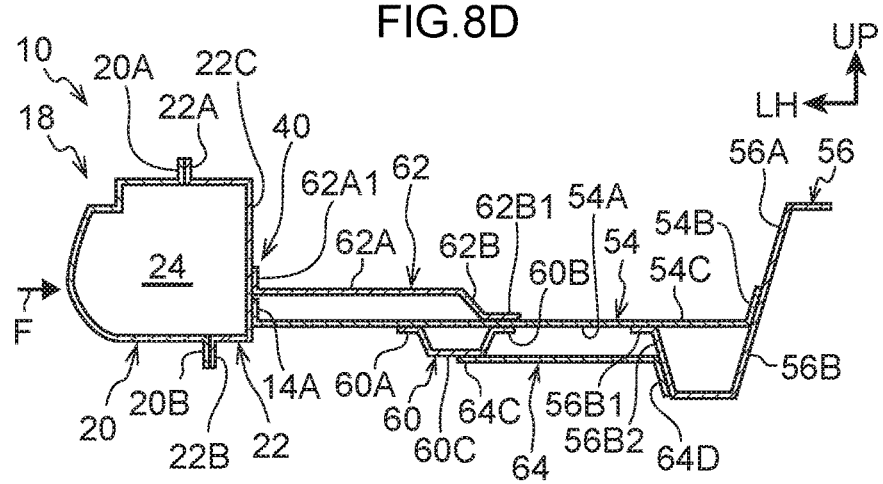
FIG. 8D is a cross-section corresponding to FIG. 7D, illustrating a Modified Example (8) of a vehicle lower portion structure according to the first exemplary embodiment of the present invention.
Figure 8E:
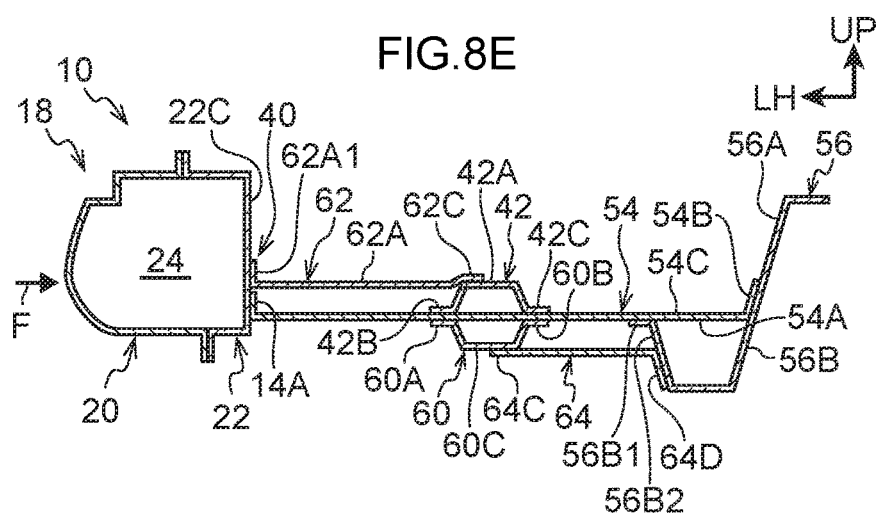
FIG. 8E is a cross-section corresponding to FIG. 7E, illustrating a Modified Example (8) of a vehicle lower portion structure according to the first exemplary embodiment of the present invention.
Figure 8F:
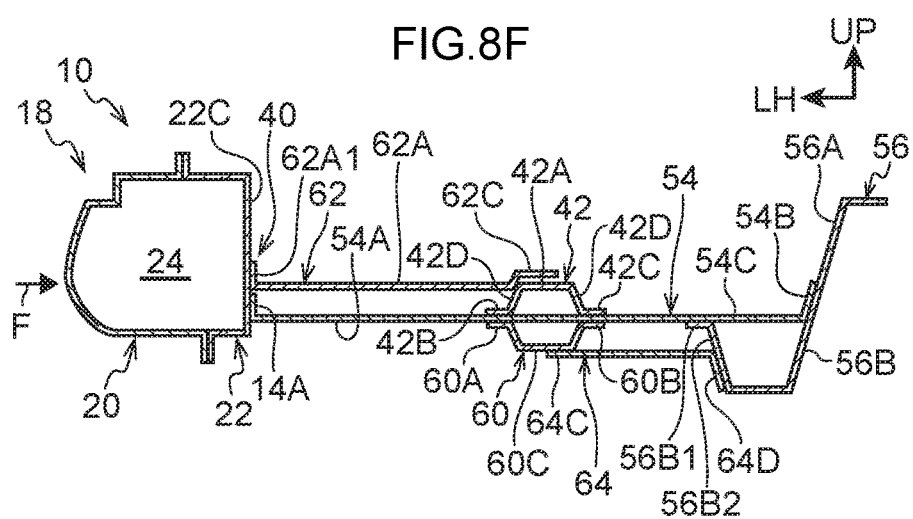
FIG. 8F is a cross-section corresponding to FIG. 7F, illustrating a Modified Example (8) of a vehicle lower portion structure according to the first exemplary embodiment of the present invention.

(8) In each of the exemplary embodiments (FIG. 7A to FIG. 7F) described above, the floor panel 54 may be applied with a split configuration centered on the floor tunnel portion 56, as illustrated in FIG. 8A to FIG. 8F respectively. As illustrated in FIG. 8A to FIG. 8C, a lower flange portion 58E may extend out downward from a vehicle width direction inner end portion of the reinforcement member 58, and the lower flange portion 58E may be joined to an inclined face 56B2 of the valley portion 56B of the floor tunnel portion 56. Note that in FIG. 8E to FIG. 8F, a lower flange portion 64D extends out downward from a vehicle width direction inner end portion of the reinforcement member 64, and the lower flange portion 64D is joined to the inclined face 56B2 of the valley portion 56B of the floor tunnel portion 56.

The shapes of the reinforcement members 36, 48, 52, the floor reinforcement upper 42, the floor reinforcement lower 60 and the like described in the above exemplary embodiments may be modified as appropriate.

Second Exemplary Embodiment

Next, explanation follows regarding a vehicle lower portion structure according to a second exemplary embodiment. Note that explanation regarding content substantially the same as that of the vehicle lower portion structure according to the first exemplary embodiment is omitted.

Vehicle Lower Portion Structure Configuration

As illustrated in FIG. 1, in the vehicle lower portion structure according to the first exemplary embodiment, the reinforcement members 36 disposed at the front portion of the floor panel 14 connect the rockers 18 and the floor tunnel portion 16 together. However, it is sufficient that the reinforcement members 36 are capable of connecting the rockers 18 and the floor tunnel portion 16 together in a state angled toward the vehicle width direction inside on progression from the input portion 40 positioned on the vehicle width direction outside and the vehicle front-rear direction front side of the floor panel 14 toward the vehicle front-rear direction rear side.

Figure 9:
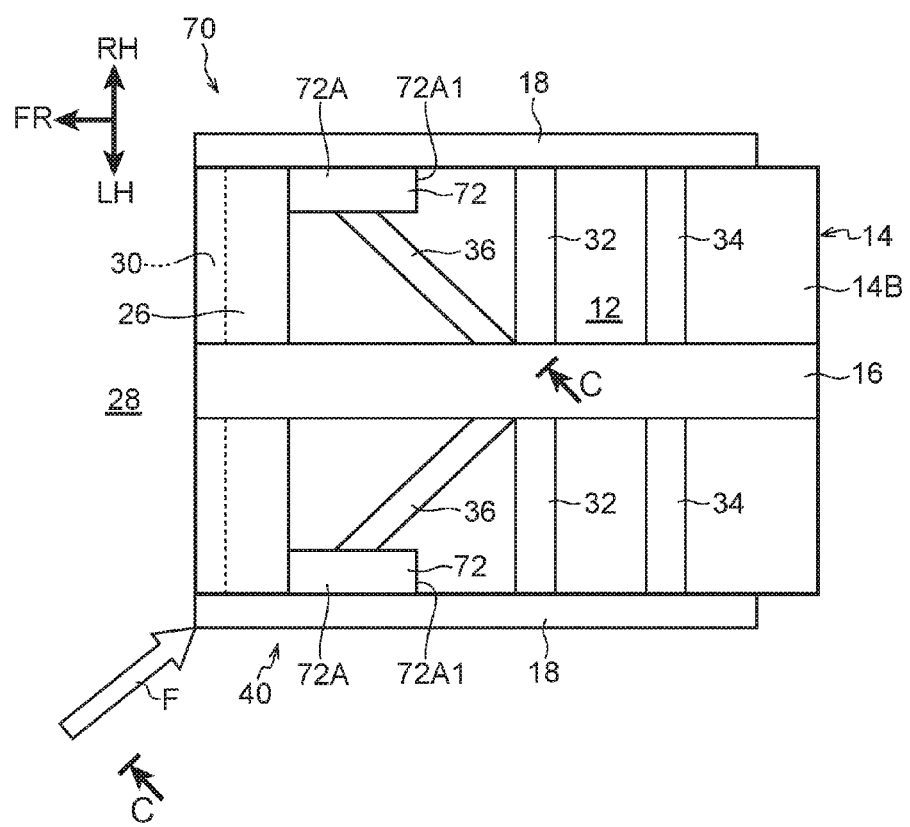
FIG. 9 is a schematic plan view illustrating a vehicle lower portion structure according to a second exemplary embodiment of the present invention.

In the present invention, "connects" encompasses cases in which a reinforcement member is joined to the input portion and/or to the floor tunnel portion indirectly through another member. Depending on the vehicle model, sometimes an interposed member 72, formed as an extension of the dash panel 26 or the dash cross member 30, is provided at the inside of the rocker 18 at the input portion. Accordingly, in the present exemplary embodiment, as illustrated in FIG. 9, explanation follows regarding an example in which the reinforcement member 36 connects the interposed member 72 and the floor tunnel portion 16 together.

The interposed member 72 illustrated in FIG. 10A is formed in a state extending from the dash panel 26. For example, although not illustrated in the drawings, when sectioned along the vehicle front-rear direction, the cross-section profile of the interposed member 72 configures a hat shape opening toward the lower side. A rear wall portion 72A1 is provided at a vehicle front-rear direction rear end portion of an upper wall portion 72A of the interposed member 72, and a rear flange portion extends out toward the rear from a lower end portion of the rear wall portion 72A1. The rear flange portion is joined to the front face 14B of the floor panel 14.

An upper flange portion 72A1 extends out upward from a vehicle width direction outer end portion of the upper wall portion 72A of the interposed member 72. The upper flange portion 72A1 is joined to the vertical wall 22C of the rocker inner panel 22 of the rocker 18. An inclined wall 72B (see FIG. 9) inclined downward on progression toward the floor tunnel portion 16 side is formed from a vehicle width direction inner end portion of the upper wall portion 72A of the interposed member 72. A flange portion 72B1 extends out horizontally toward the floor tunnel portion 16 side from a lower end portion of the inclined wall 72B, and the flange portion 72B1 is joined to the front face 14B of the floor panel 14.

An outer flange portion 36D extends out horizontally toward the interposed member 72 from a vehicle width direction outer end portion of the upper wall portion 36C of the reinforcement member 36. The outer flange portion 36D is joined to the upper wall portion 72A of the interposed member 72. An upper flange portion 36C2 extends out upward from a vehicle width direction inner end portion of the upper wall portion 36C of the reinforcement member 36, and the upper flange portion 36C2 is joined to the outside of the side wall 16A of the floor tunnel portion 16 at the front side of the floor cross member 32. Note that a portion of an inner end portion of the reinforcement member 36 may be joined to the floor cross member 32.

Vehicle Lower Portion Structure Operation and Advantageous Effects

As illustrated in FIG. 1, in the first exemplary embodiment, the reinforcement member 36 connects the rocker 18 and the floor tunnel portion 16 together. However, in the present exemplary embodiment, as illustrated in FIG. 9, the reinforcement member 36 is connected to the rocker 18 through the interposed member 72, thereby connecting the rocker 18 and the floor tunnel portion 16 together through the interposed member 72.

Accordingly, in the present exemplary embodiment, the interposed member 72 is provided between the rocker 18 and the reinforcement member 36. However, the collision load F input to the rocker 18 can be transmitted to the reinforcement member 36 through the rocker 18 and the interposed member 72. Moreover, collision load (<F) transmitted to the reinforcement member 36 can be transmitted to the floor tunnel portion 16 through the reinforcement member 36.

Other Exemplary Embodiments (1) As illustrated in FIG. 10B and FIG. 10C, the floor reinforcement upper 42 may be disposed running along the vehicle front-rear direction above the floor panel 14. In such cases, the configuration of a vehicle lower portion structure 70 is substantially the same as the configuration of the vehicle lower portion structure 10 illustrated in FIG. 2B and FIG. 2C. Note that FIG. 10B illustrates a configuration applied with the reinforcement members 44, 46 and the floor reinforcement upper 42 of FIG. 2B. FIG. 10C illustrates a configuration applied with the reinforcement member 48 and the floor reinforcement upper 42 of FIG. 2C.

Note that in FIG. 10B, a flange portion 44B extends out from a vehicle width direction outer end portion of the upper wall portion 44A of the reinforcement member 44. The flange portion 44B is joined to the upper wall portion 72A of the interposed member 72. In FIG. 10C, a flange portion 48B extends out from a vehicle width direction outer end portion of the upper wall portion 48A of the reinforcement member 48. The flange portion 48B is joined to the upper wall portion 72A of the interposed member 72.

Figure 10D:
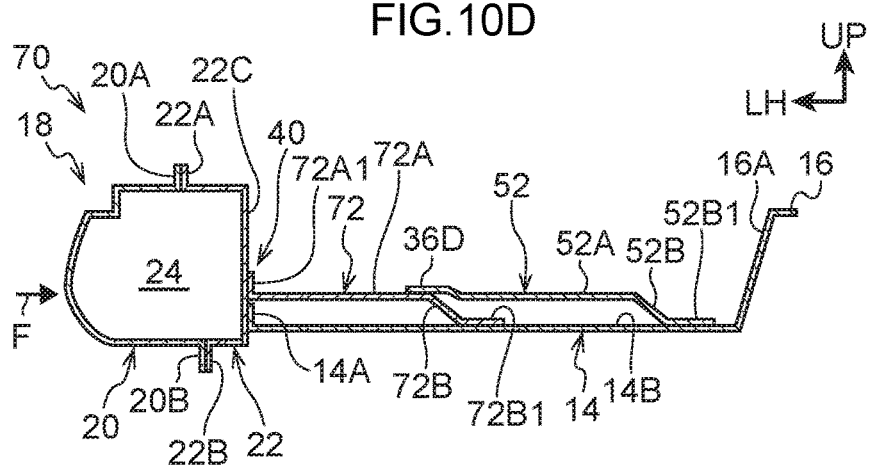
FIG. 10D is a cross-section corresponding to FIG. 2D, illustrating a Modified Example (1) of a vehicle lower portion structure according to the second exemplary embodiment of the present invention.
Figure 10E:
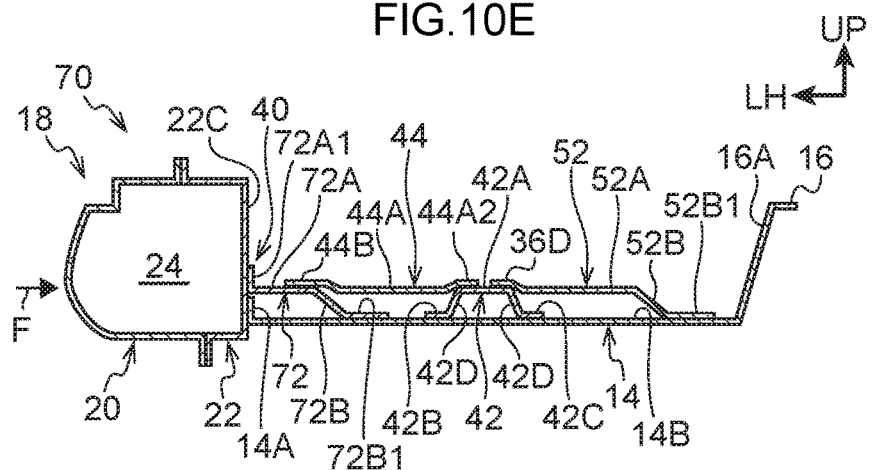
FIG. 10E is a cross-section corresponding to FIG. 2E, illustrating a Modified Example (1) of a vehicle lower portion structure according to the second exemplary embodiment of the present invention.
Figure 10F:
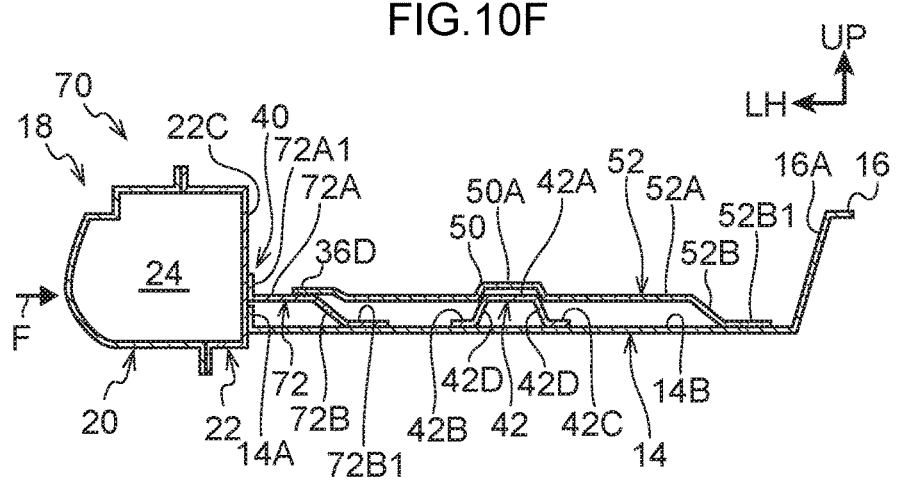
FIG. 10F is a cross-section corresponding to FIG. 2F, illustrating a Modified Example (1) of a vehicle lower portion structure according to the second exemplary embodiment of the present invention.
Figure 11A:
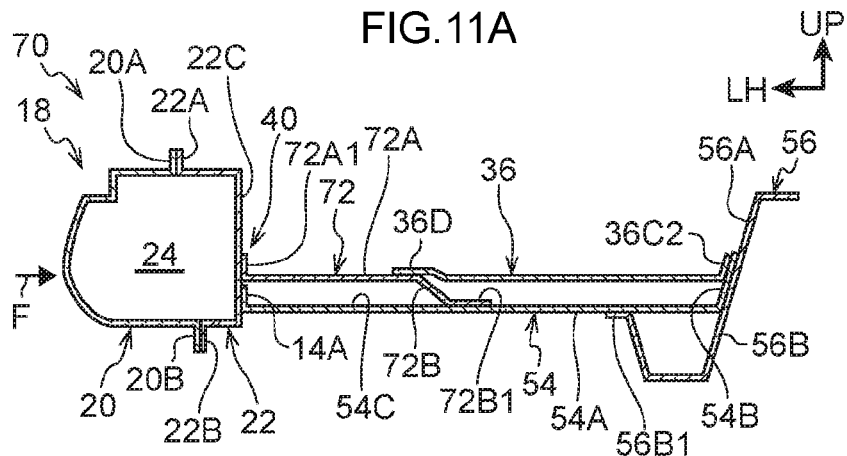
FIG. 11A is a cross-section corresponding to FIG. 1 OA, illustrating a Modified Example (2) of a vehicle lower portion structure according to the second exemplary embodiment of the present invention.
Figure 11B:
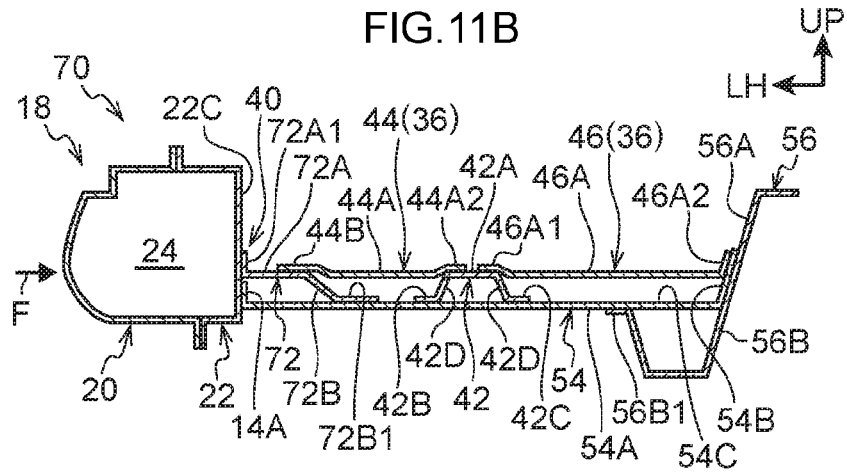
FIG. 11B is a cross-section corresponding to FIG. 10B, illustrating a Modified Example (2) of a vehicle lower portion structure according to the second exemplary embodiment of the present invention.
Figure 11C:
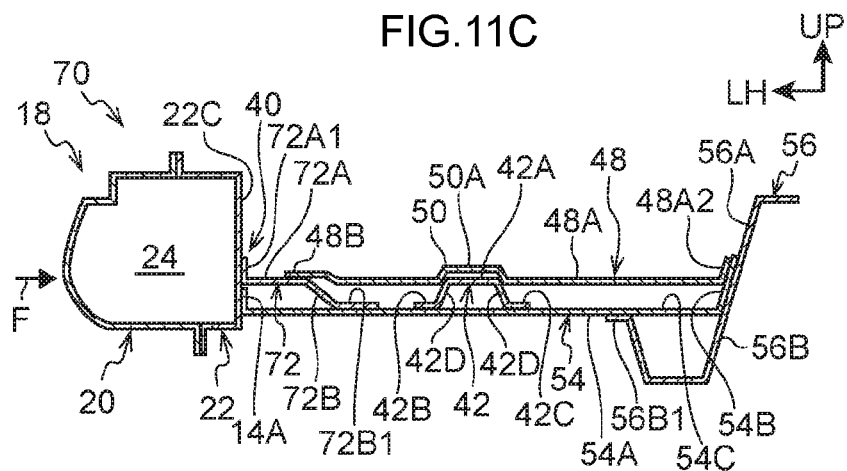
FIG. 11C is a cross-section corresponding to FIG. 10C, illustrating a Modified Example (2) of a vehicle lower portion structure according to the second exemplary embodiment of the present invention.
Figure 11D:
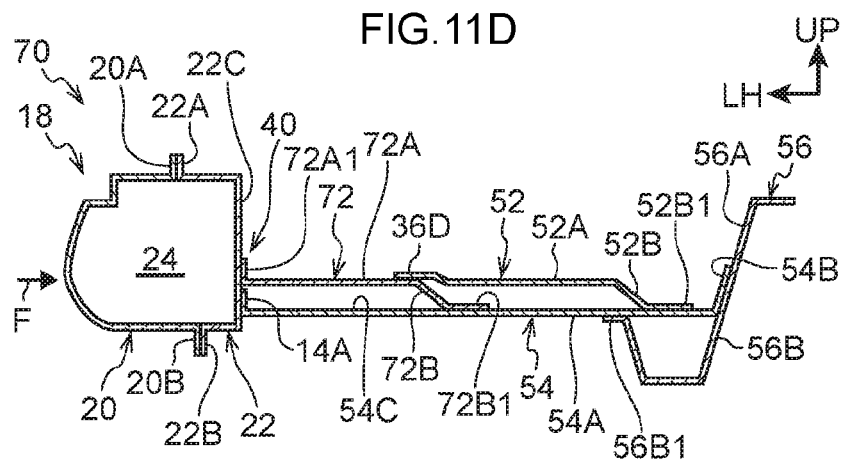
FIG. 11D is a cross-section corresponding to FIG. 10D, illustrating a Modified Example (2) of a vehicle lower portion structure according to the second exemplary embodiment of the present invention.
Figure 11E:
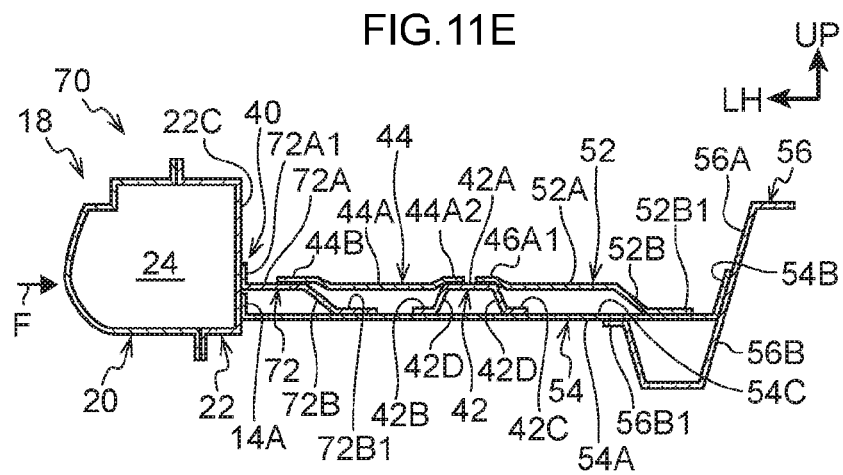
FIG. 11E is a cross-section corresponding to FIG. 10E, illustrating a Modified Example (2) of a vehicle lower portion structure according to the second exemplary embodiment of the present invention.
Figure 11F:
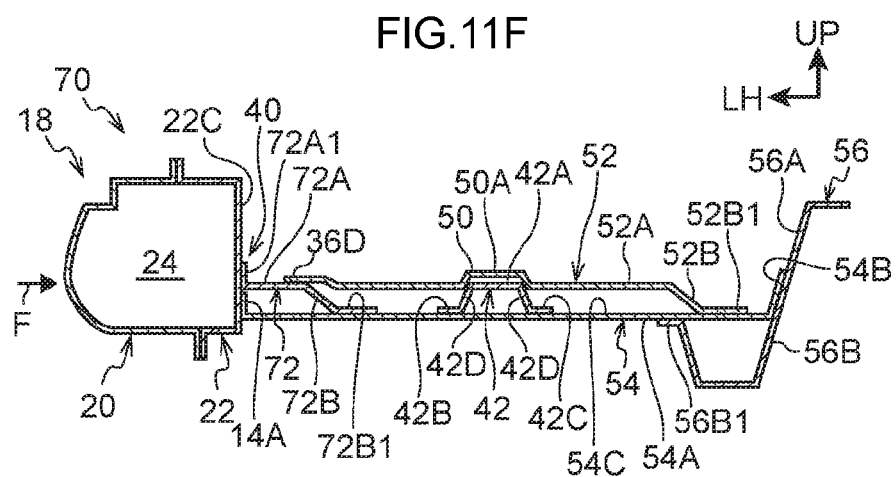
FIG. 11F is a cross-section corresponding to FIG. 10F, illustrating a Modified Example (2) of a vehicle lower portion structure according to the second exemplary embodiment of the present invention.

As illustrated in FIG. 10D, in place of the reinforcement member 36 illustrated in FIG. 10A, an inclined wall 52B may be formed at a vehicle width direction inner end portion of the upper wall portion 52A of the reinforcement member 52, and a flange portion 52B1 extending out from a lower end portion of the inclined wall 52B may be joined to the front face 14B of the floor panel 14. Likewise in FIG. 10E and FIG. 10F, similarly to in FIG. 10D, in place of the reinforcement members 46, 48 in FIG. 10B and FIG. 10C, an inclined wall 52B may be formed at a vehicle width direction inner end portion of the upper wall portion 52A of the reinforcement member 52, and a flange portion 52B1 extending out from a lower end portion of the inclined wall 52B may be joined to the front face 14B of the floor panel 14.

(2) As illustrated in FIG. 11A to FIG. 11F, the floor panel 54 of FIG. 10A to FIG. 10F described above may have a split configuration centered on the floor tunnel portion 56. In such cases, the respective configurations of the floor panel 54 and the floor tunnel portion 56 may be applied in place of the floor panel 14 illustrated in FIG. 10A to FIG. 10F.

Figure 12A:
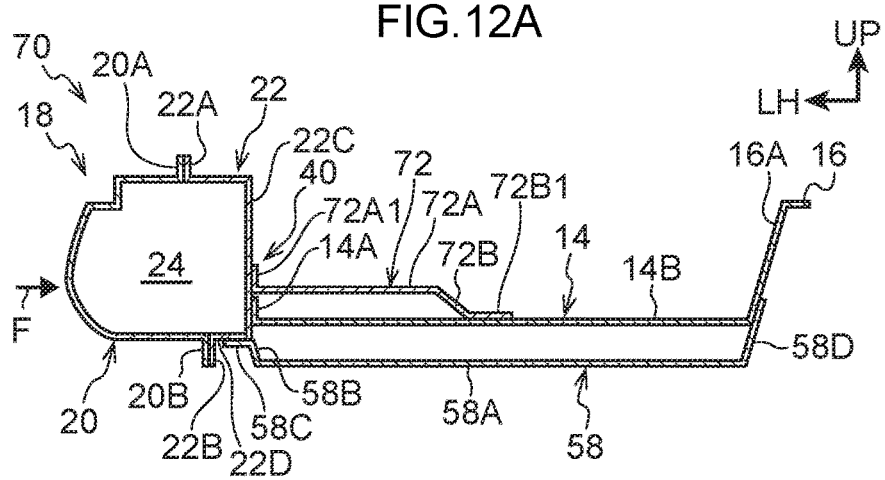
FIG. 12A is a cross-section corresponding to FIG. 5A, illustrating a Modified Example (3) of a vehicle lower portion structure according to the second exemplary embodiment of the present invention.
Figure 12B:
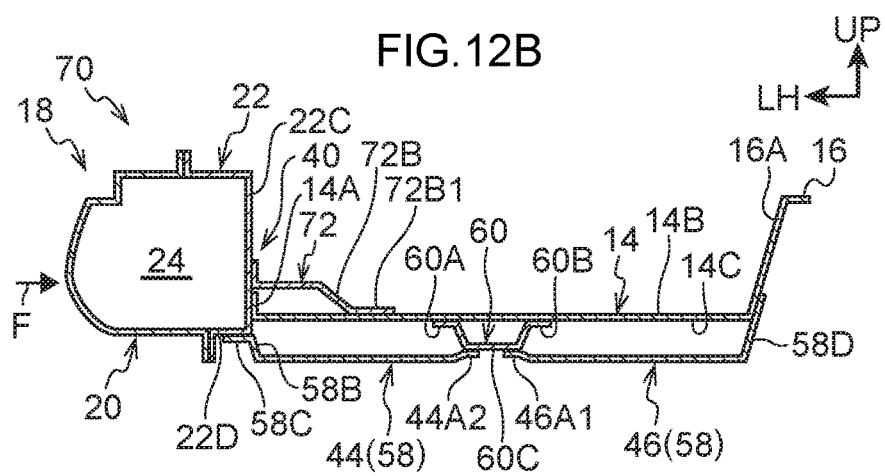
FIG. 12B is a cross-section corresponding to FIG. 5B, illustrating a Modified Example (3) of a vehicle lower portion structure according to the second exemplary embodiment of the present invention.
Figure 12C:
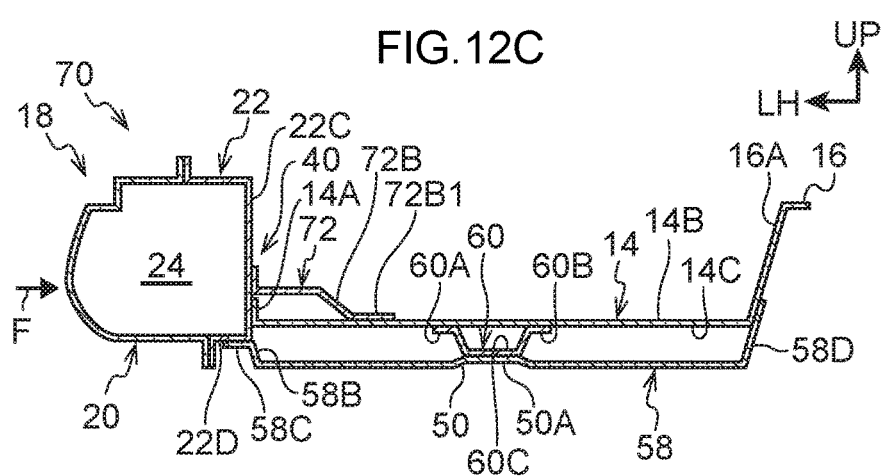
FIG. 12C is a cross-section corresponding to FIG. 5C, illustrating a Modified Example (3) of a vehicle lower portion structure according to the second exemplary embodiment of the present invention.
Figure 13A:
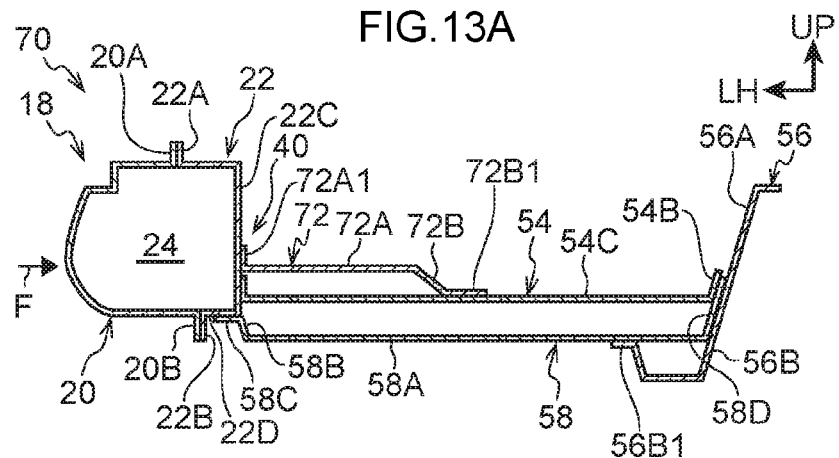
FIG. 13A is a cross-section corresponding to FIG. 12A, illustrating a Modified Example (4) of a vehicle lower portion structure according to the second exemplary embodiment of the present invention.
Figure 13B:
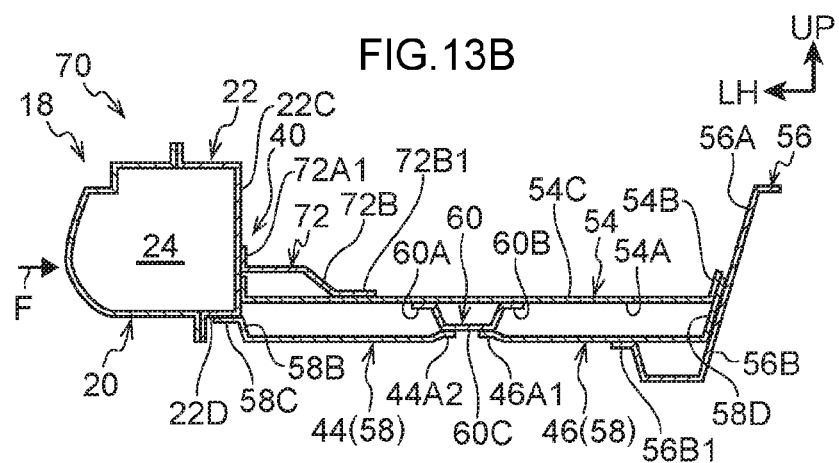
FIG. 13B is a cross-section corresponding to FIG. 12B, illustrating a Modified Example (4) of a vehicle lower portion structure according to the second exemplary embodiment of the present invention.
Figure 13C:
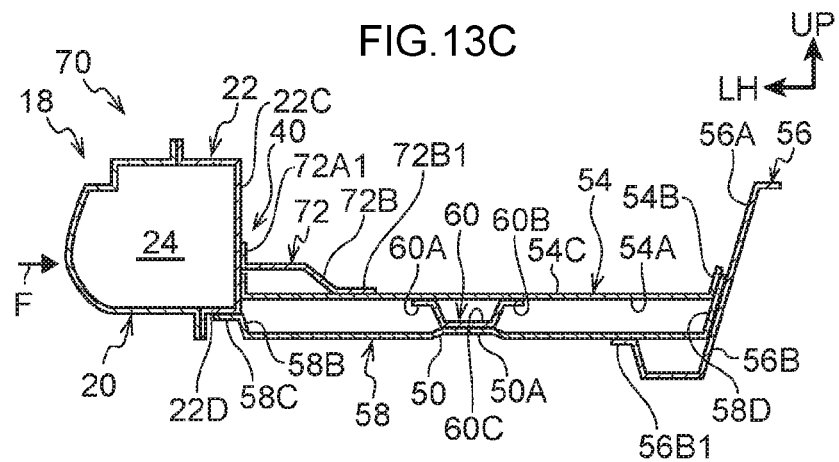
FIG. 13C is a cross-section corresponding to FIG. 12C, illustrating a Modified Example (4) of a vehicle lower portion structure according to the second exemplary embodiment of the present invention.
Figure 13D:
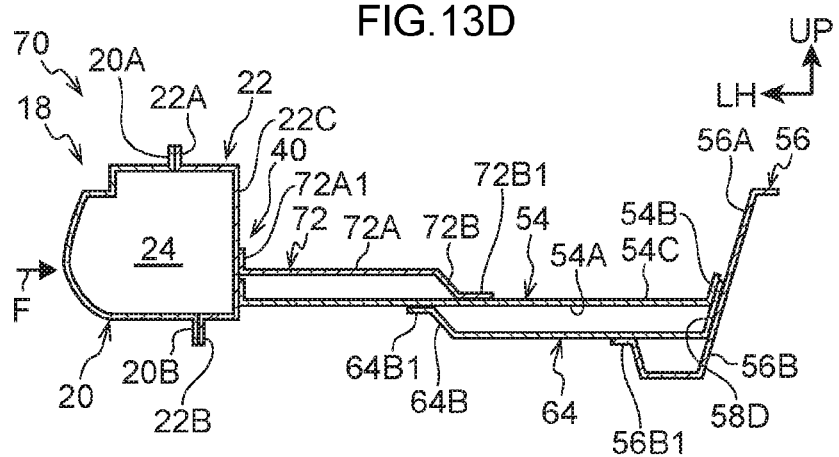
FIG. 13D is a cross-section corresponding to FIG. 12D, illustrating a Modified Example (4) of a vehicle lower portion structure according to the second exemplary embodiment of the present invention.
Figure 13E:
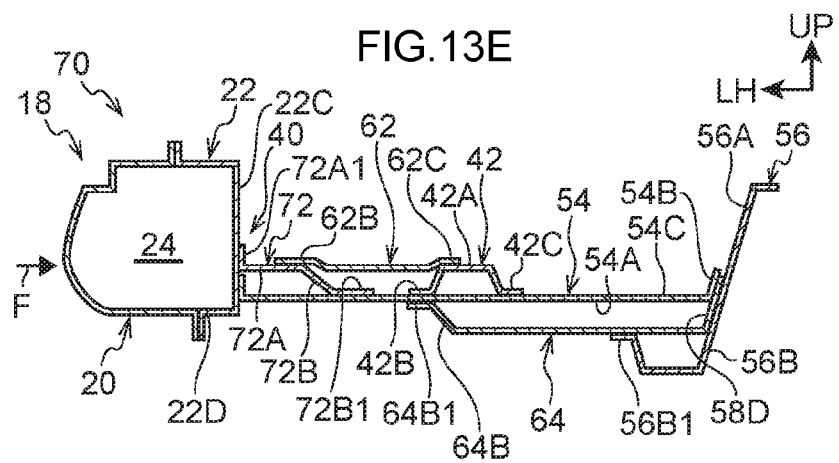
FIG. 13E is a cross-section corresponding to FIG. 12E, illustrating a Modified Example (4) of a vehicle lower portion structure according to the second exemplary embodiment of the present invention.
Figure 13F:
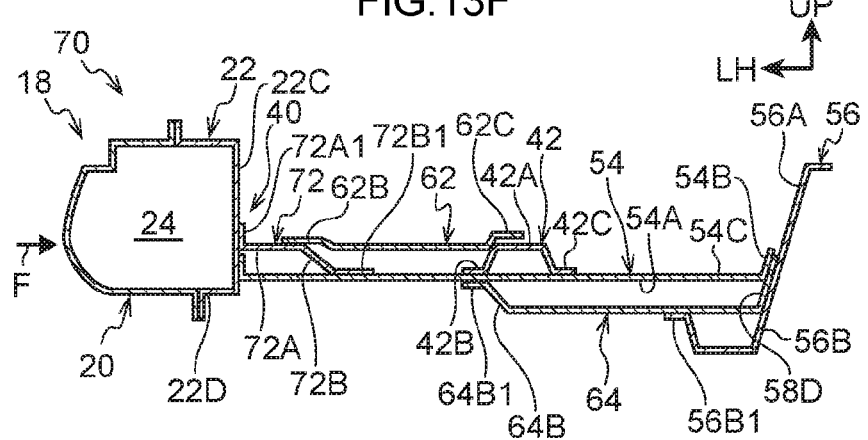
FIG. 13F is a cross-section corresponding to FIG. 12F, illustrating a Modified Example (4) of a vehicle lower portion structure according to the second exemplary embodiment of the present invention.
Figure 14A:
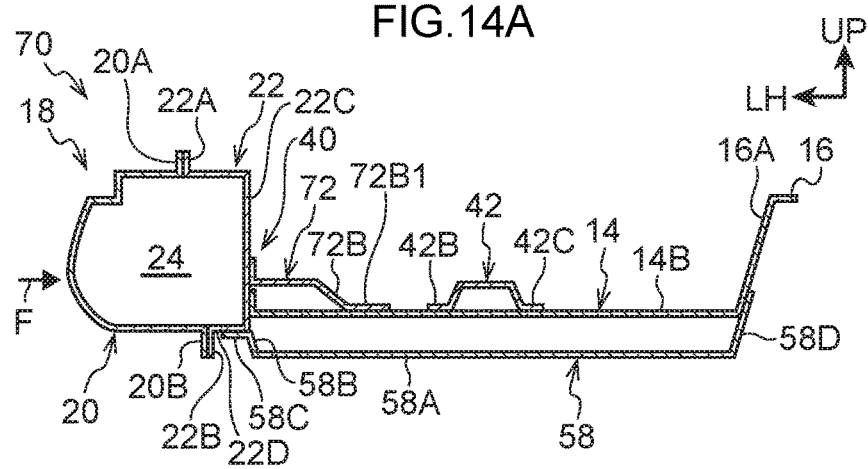
FIG. 14A is a cross-section corresponding to FIG. 7A and FIG. 12A, illustrating a Modified Example (5) of a vehicle lower portion structure according to the second exemplary embodiment of the present invention.
Figure 14B:
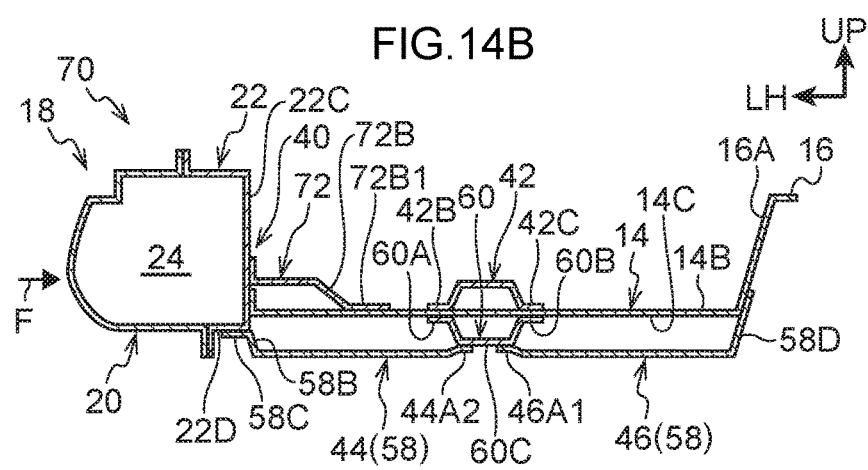
FIG. 14B is a cross-section corresponding to FIG. 7B and FIG. 12B, illustrating a Modified Example (5) of a vehicle lower portion structure according to the second exemplary embodiment of the present invention.
Figure 14C:
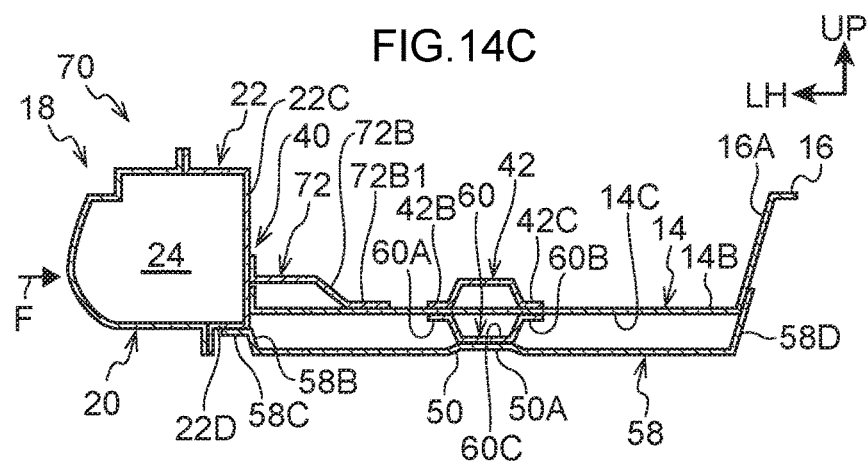
FIG. 14C is a cross-section corresponding to FIG. 7C and FIG. 12C, illustrating a Modified Example (5) of a vehicle lower portion structure according to the second exemplary embodiment of the present invention.
Figure 14D:
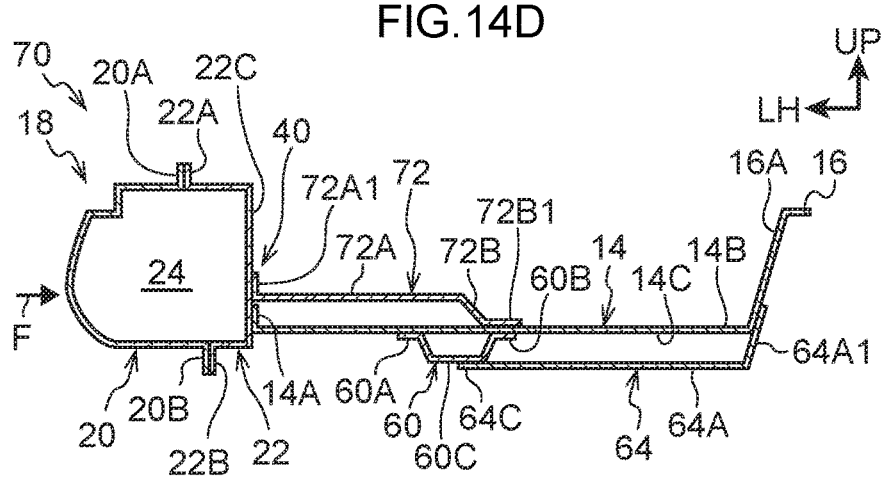
FIG. 14D is a cross-section corresponding to FIG. 7D and FIG. 12D, illustrating a Modified Example (5) of a vehicle lower portion structure according to the second exemplary embodiment of the present invention.
Figure 14E:
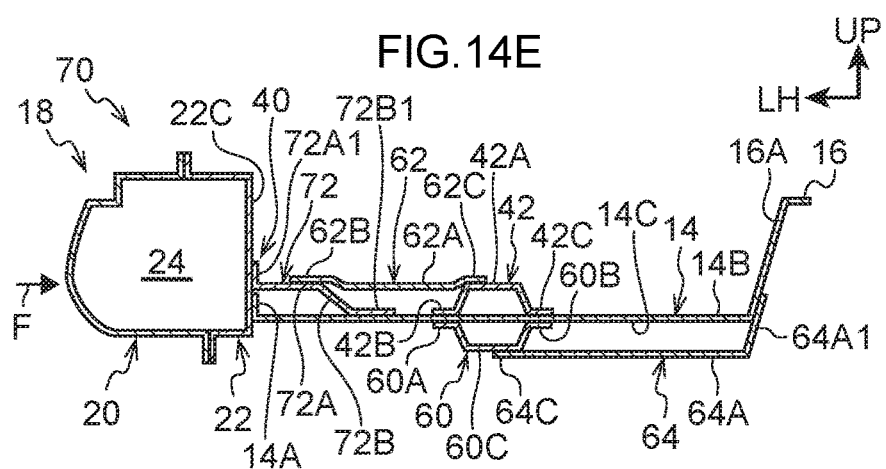
FIG. 14E is a cross-section corresponding to FIG. 7E and FIG. 12E, illustrating a Modified Example (5) of a vehicle lower portion structure according to the second exemplary embodiment of the present invention.
Figure 14F:
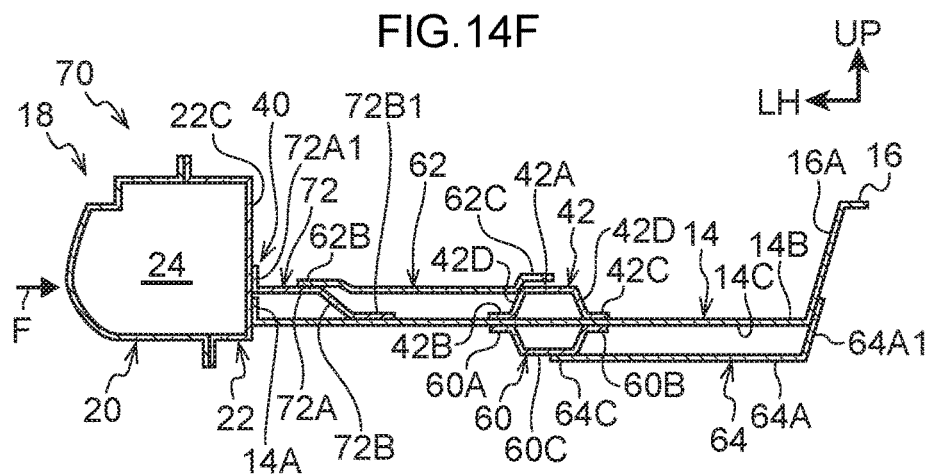
FIG. 14F is a cross-section corresponding to FIG. 7F and FIG. 12F, illustrating a Modified Example (5) of a vehicle lower portion structure according to the second exemplary embodiment of the present invention.
Figure 15A:
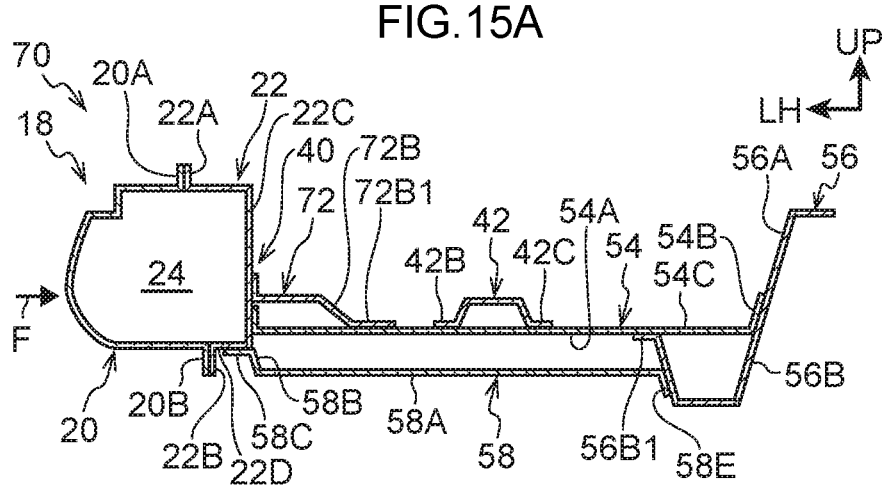
FIG. 15A is a cross-section corresponding to FIG. 14A, illustrating a Modified Example (6) of a vehicle lower portion structure according to the second exemplary embodiment of the present invention.
Figure 15B:
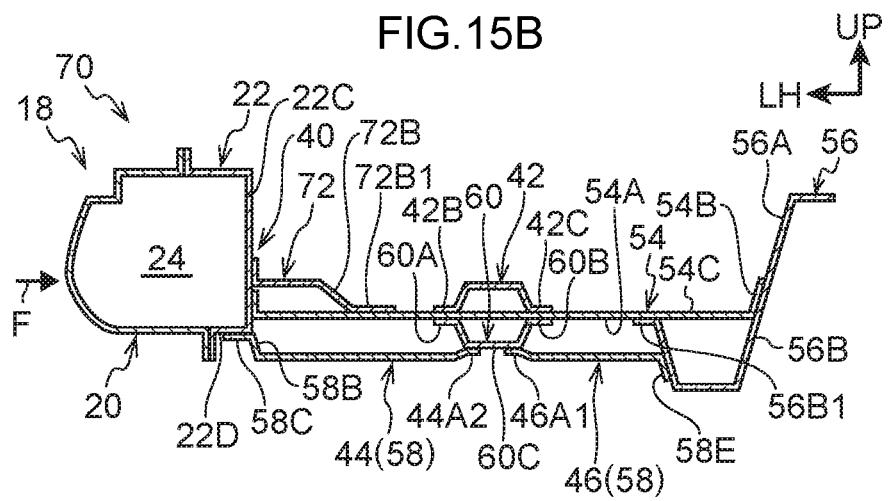
FIG. 15B is a cross-section corresponding to FIG. 14B, illustrating a Modified Example (6) of a vehicle lower portion structure according to the second exemplary embodiment of the present invention.
Figure 15C:
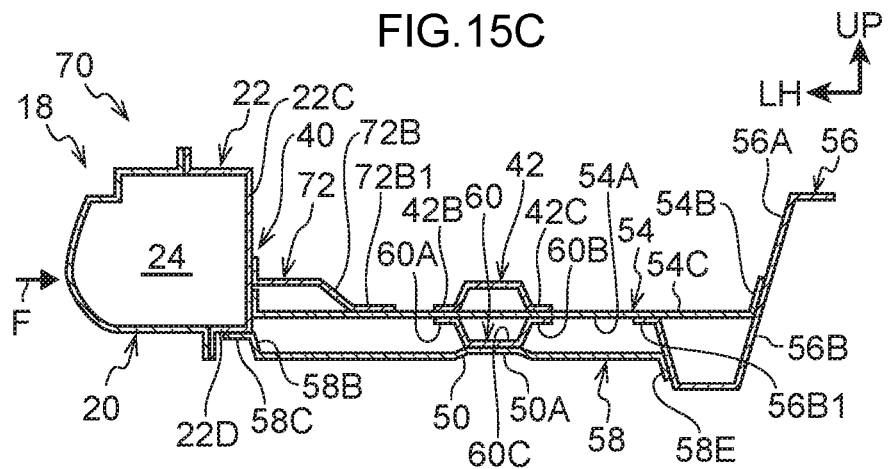
FIG. 15C is a cross-section corresponding to FIG. 14C, illustrating a Modified Example (6) of a vehicle lower portion structure according to the second exemplary embodiment of the present invention.

(3) As illustrated in FIG. 12A to FIG. 12F, a reinforcement member 58 may be disposed below the floor panel 14. FIG. 12A to FIG. 12C respectively illustrate application of the configurations of the reinforcement member 58 illustrated in FIG. 5A to FIG. 5C in such cases, and FIG. 12D to FIG. 12F respectively illustrate application of the configurations of the reinforcement member 64 illustrated in FIG. 5D to FIG. 5F in such cases. Note that a flange portion 62B extends out from a vehicle width direction outer end portion of the upper wall portion 62A of the reinforcement member 62 illustrated in FIG. 12E and FIG. 12F, and the flange portion 62B is joined to the upper wall portion 72A of the interposed member 72.

(4) In the configurations of FIG. 12A to FIG. 12F, as illustrated in FIG. 13A to FIG. 13F, configuration may be made with the floor panel 54 that has a split configuration centered on the floor tunnel portion 56. In such cases, the respective configurations of the floor panel 54 and the floor tunnel portion 56 are applied in place of the floor panel 14 illustrated in FIG. 12A to FIG. 12F.

(5) As illustrated in FIG. 14A to FIG. 14F, in the configurations of FIG. 12A to FIG. 12F, the floor reinforcement upper 42 running along the vehicle front-rear direction and the reinforcement member 62 may be disposed above the floor panel 14. In such cases, in FIG. 14A to FIG. 14F, the respective configurations of the reinforcement member 42 and the floor reinforcement upper 62 illustrated in FIG. 7A to FIG. 7F are applied.

(6) In the configurations of FIG. 14A to FIG. 14F, as illustrated in FIG. 15A to FIG. 15F, configuration may be made with the floor panel 54 that has a split configuration centered on the floor tunnel portion 56. In such cases, the respective configurations of the floor panel 54 and the floor tunnel portion 56 are applied in place of the floor panel 14 illustrated in FIG. 14A to FIG. 14F.

The configurations illustrated in FIG. 12 to FIG. 15 are provided with the interposed member 72, and the reinforcement member 58 connects the rocker 18 and the floor tunnel portion 16 (floor tunnel portion 56) together. Moreover, in the present exemplary embodiment, explanation has been given in which the interposed member 72 is an extension portion of the dash panel 26. However, the interposed member 72 may be an extension portion of the dash cross member 30, or may be a separate member to the dash panel 26 and the dash cross member 30.

In the configurations described above, the reinforcement members 36 and the like are disposed on both vehicle width direction sides of the floor panel 14 with the floor tunnel portion 16 between them. However, it is sufficient that the reinforcement member 36 and the like are provided on at least one side.

Explanation has been given regarding individual exemplary embodiments of the present invention; however, the present invention is not limited to such exemplary embodiments, and the exemplary embodiments and various modified examples may be employed in appropriate combinations, and obviously various configurations may be implemented within a range not departing from the spirit of the present invention.

The invention claimed is:

1. A vehicle lower portion structure comprising:
   a rocker that is provided running along a vehicle front-rear direction at a vehicle width direction outside of a floor panel configuring a floor portion of a vehicle cabin;
   a floor tunnel portion that extends along the vehicle front-rear direction at a vehicle width direction central portion of the floor panel; and
   a reinforcement member that is disposed at a vehicle front-rear direction front portion of the floor panel, that is angled toward a vehicle width direction inside on progression toward the vehicle front-rear direction rear side from an input portion, the input portion being located at a position at a vehicle width direction outside and at the vehicle front-rear direction front side of the floor panel and being input with a collision load in the event of a frontal small overlap collision or a frontal oblique collision at the vehicle width direction outside of the vehicle, and that connects the input portion and the floor tunnel portion together, the reinforcement member receiving the collision load as axial force, wherein:
   a dash panel is provided at the front portion of the floor panel so as to partition the vehicle cabin from a power unit room formed at a vehicle front-rear direction front side of the vehicle cabin, and
   a vehicle front-rear direction front portion of the reinforcement member is connected to either the dash panel, or to a dash cross member extending along the vehicle width direction at the dash panel.

2. The vehicle lower portion structure of claim 1, wherein the vehicle front-rear direction front portion of the reinforcement member is also connected to the rocker.

3. The vehicle lower portion structure of claim 1, wherein:
   a floor cross member spans between the rocker and the floor tunnel portion in the vehicle width direction, and
   at least a portion of a vehicle front-rear direction rear portion of the reinforcement member is joined to the floor cross member.

* * * * *